United States Patent
Komeiji et al.

(10) Patent No.: US 9,245,524 B2
(45) Date of Patent: Jan. 26, 2016

(54) SPEECH RECOGNITION DEVICE, SPEECH RECOGNITION METHOD, AND COMPUTER READABLE MEDIUM

(75) Inventors: Shuji Komeiji, Tokyo (JP); Takayuki Arakawa, Tokyo (JP); Takafumi Koshinaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 332 days.

(21) Appl. No.: 13/883,716

(22) PCT Filed: Nov. 10, 2011

(86) PCT No.: PCT/JP2011/076460
§ 371 (c)(1),
(2), (4) Date: May 6, 2013

(87) PCT Pub. No.: WO2012/063963
PCT Pub. Date: May 18, 2012

(65) Prior Publication Data
US 2013/0231929 A1 Sep. 5, 2013

(30) Foreign Application Priority Data
Nov. 11, 2010 (JP) ................................. 2010-252456

(51) Int. Cl.
*G10L 15/20* (2006.01)
*G10L 15/065* (2013.01)
*G10L 21/0208* (2013.01)

(52) U.S. Cl.
CPC ............... *G10L 15/20* (2013.01); *G10L 15/065* (2013.01); *G10L 21/0208* (2013.01)

(58) Field of Classification Search
CPC ..................................................... G10L 15/22
See application file for complete search history.

(56) References Cited

U.S. PATENT DOCUMENTS

2005/0010406 A1\* 1/2005 Koshiba et al. ............... 704/233
2007/0055508 A1\* 3/2007 Zhao et al. .................... 704/226
(Continued)

FOREIGN PATENT DOCUMENTS

JP    2000-330597 A    11/2000
JP    2003-177781 A    6/2003
(Continued)

OTHER PUBLICATIONS

Hirosi Matsumoto, "Speech Recognition Techniques for Noisy Environments", second Forum on Information Technology (FIT2003), pp. 1-pp. 4, Sep. 2003, Concise English Language explanation found in Applicant's specification, p. 3.
(Continued)

*Primary Examiner* — Douglas Godbold

(57) ABSTRACT

The present invention can increase the types of noises that can be dealt with enough to enable speech recognition with a speech recognition rate of high accuracy.
A speech recognition device of the present invention performs processes of: storing, in a manner to relate them to each other, a suppression coefficient representing a noise suppression amount and an adaptation coefficient representing an adaptation amount of a noise model, where the noise model is generated on the basis of a predetermined noise and is to be compounded (synthesized) to a clean acoustic model generated on the basis of a voice including no noise; estimating noise from an input signal; suppressing from the input signal a portion of the estimated noise of an amount specified by a suppression amount specified on the basis of the suppression coefficient; generating an adapted acoustic model which is noise-adapted, by compounding (synthesizing) the clean acoustic model with a noise model generated on the basis of the estimated noise in accordance with an adaptation amount specified on the basis of the adaptation coefficient; and recognizing voice on the basis of the noise-suppressed input signal and the generated adapted acoustic model.

20 Claims, 20 Drawing Sheets

(56) References Cited

U.S. PATENT DOCUMENTS

| | | | |
|---|---|---|---|
| 2008/0027722 A1* | 1/2008 | Haulick et al. | 704/226 |
| 2008/0175408 A1* | 7/2008 | Mukund et al. | 381/94.1 |
| 2008/0201138 A1* | 8/2008 | Visser et al. | 704/227 |
| 2008/0294430 A1* | 11/2008 | Ichikawa | 704/226 |
| 2009/0265168 A1* | 10/2009 | Kang et al. | 704/226 |
| 2010/0036659 A1* | 2/2010 | Haulick et al. | 704/226 |
| 2010/0063807 A1* | 3/2010 | Archibald et al. | 704/226 |
| 2010/0217586 A1* | 8/2010 | Shimada et al. | 704/226 |
| 2011/0077939 A1* | 3/2011 | Jung et al. | 704/226 |
| 2011/0099007 A1* | 4/2011 | Zhang | 704/211 |
| 2011/0103603 A1* | 5/2011 | Pan et al. | 381/71.1 |
| 2011/0305345 A1* | 12/2011 | Bouchard et al. | 381/23.1 |

FOREIGN PATENT DOCUMENTS

| | | |
|---|---|---|
| JP | 2004-309959 A | 11/2004 |
| JP | 2004-347956 A | 12/2004 |
| JP | 2005-31258 A | 2/2005 |
| JP | 2005-321539 A | 11/2005 |
| JP | 2005326673 A | 11/2005 |
| JP | 2006-3617 A | 1/2006 |
| JP | 2006-163231 A | 6/2006 |
| JP | 4282227 B2 | 3/2009 |
| JP | 2009-216760 A | 9/2009 |

OTHER PUBLICATIONS

International Search Report of PCT Application No. PCT/JP2011/076460 mailed on Feb. 28, 2012.

Japanese Office Action for JP Application No. 2012-542995 mailed on Oct. 6, 2015 with English Translation.

* cited by examiner

Fig.5

| STATE NUMBER, GAUSSIAN NUMBER | CLEAN ACOUSTIC MODEL $\Lambda_x$ | | | | | |
|---|---|---|---|---|---|---|
| | STATIC AVERAGE | FIRST-ORDER DYNAMIC AVERAGE | SECOND-ORDER DYNAMIC AVERAGE | STATIC VARIANCE | FIRST-ORDER DYNAMIC VARIANCE | SECOND-ORDER DYNAMIC VARIANCE |
| ... | ... | ... | ... | ... | ... | ... |
| $i, j-1$ | $\mu_{xi(j-1)}$ | $\Delta\mu_{xi(j-1)}$ | $\Delta\Delta\mu_{xi(j-1)}$ | $\Sigma_{xi(j-1)}$ | $\Delta\Sigma_{xi(j-1)}$ | $\Delta\Delta\Sigma_{xi(j-1)}$ |
| $i, j$ | $\mu_{xij}$ | $\Delta\mu_{xij}$ | $\Delta\Delta\mu_{xij}$ | $\Sigma_{xij}$ | $\Delta\Sigma_{xij}$ | $\Delta\Delta\Sigma_{xij}$ |
| $i, j+1$ | $\mu_{xi(j+1)}$ | $\Delta\mu_{xi(j+1)}$ | $\Delta\Delta\mu_{xi(j+1)}$ | $\Sigma_{xi(j+1)}$ | $\Delta\Sigma_{xi(j+1)}$ | $\Delta\Delta\Sigma_{xi(j+1)}$ |
| ... | ... | ... | ... | ... | ... | ... |

Fig.6

| TIME INFORMATION | ESTIMATED NOISE (FEATURE) | NOISE STATISTICS $\Lambda_n$ | | | |
|---|---|---|---|---|---|
| | | STATIC AVERAGE | STATIC VARIANCE | FIRST-ORDER DYNAMIC VARIANCE | SECOND-ORDER DYNAMIC VARIANCE |
| 0 | $n_0$ | | | | |
| ... | ... | | | | |
| $T-1$ | $n_{T-1}$ | | | | |
| $T$ | $n_T$ | $\mu_n$ | $\Sigma_n$ | $\Delta\Sigma_n$ | $\Delta\Delta\Sigma_n$ |

Fig.7

| STATE NUMBER, GAUSSIAN NUMBER | ADAPTED ACOUSTIC MODEL $\Lambda_z$ | | | | | |
|---|---|---|---|---|---|---|
| | STATIC AVERAGE | FIRST-ORDER DYNAMIC AVERAGE | SECOND-ORDER DYNAMIC AVERAGE | STATIC VARIANCE | FIRST-ORDER DYNAMIC VARIANCE | SECOND-ORDER DYNAMIC VARIANCE |
| ... | ... | ... | ... | ... | ... | ... |
| $i, j-1$ | $\mu_{zi(j-1)}$ | $\Delta\mu_{zi(j-1)}$ | $\Delta\Delta\mu_{zi(j-1)}$ | $\Sigma_{zi(j-1)}$ | $\Delta\Sigma_{zi(j-1)}$ | $\Delta\Delta\Sigma_{zi(j-1)}$ |
| $i, j$ | $\mu_{zij}$ | $\Delta\mu_{zij}$ | $\Delta\Delta\mu_{zij}$ | $\Sigma_{zij}$ | $\Delta\Sigma_{zij}$ | $\Delta\Delta\Sigma_{zij}$ |
| $i, j+1$ | $\mu_{zi(j+1)}$ | $\Delta\mu_{zi(j+1)}$ | $\Delta\Delta\mu_{zi(j+1)}$ | $\Sigma_{zi(j+1)}$ | $\Delta\Sigma_{zi(j+1)}$ | $\Delta\Delta\Sigma_{zi(j+1)}$ |
| ... | ... | ... | ... | ... | ... | ... |

Fig.9

| TIME INFORMATION | TIME DOMAIN DATA OF TRAINING SIGNAL |
|---|---|
| 0 | $x[0]$ |
| ⋮ | ⋮ |
| $T-1$ | $x[T-1]$ |
| $T$ | $x[T]$ |

Fig.10

| TIME INFORMATION | FEATURE OF NOISE-SUPPRESSED SIGNAL |
|---|---|
| 0 | $z_0$ |
| ⋮ | ⋮ |
| $T-1$ | $z_{T-1}$ |
| $T$ | $z_T$ |

Fig.19

|        | airport | babble | train-station | restaurant | car   | street | subway | exhibition |
|--------|---------|--------|---------------|------------|-------|--------|--------|------------|
| SNR-5  | 36.74   | 20.47  | 29.81         | 26.47      | 33.67 | 27.84  | 36.84  | 38.04      |
|        | 23.8    | 21.4   | 24.99         | 22.17      | 25.8  | 31.23  | 43.97  | 33.6       |
| SNR0   | 70.27   | 61.19  | 63.28         | 64.42      | 66.18 | 60.94  | 68.9   | 60.66      |
|        | 51.57   | 46.67  | 54.46         | 50.02      | 56.93 | 59.85  | 72.55  | 66.03      |
| SNR5   | 87.21   | 85.25  | 83.18         | 86         | 81.84 | 80.08  | 83.51  | 77.45      |
|        | 74.47   | 73.46  | 78.96         | 75.38      | 83.95 | 83.4   | 88.52  | 85.04      |
| SNR10  | 94.21   | 93.74  | 90.84         | 96.1       | 90.01 | 88.78  | 91.46  | 86.58      |
|        | 89.92   | 88.51  | 91.82         | 87.29      | 94.24 | 92.5   | 94.2   | 93.46      |
| SNR15  | 96.81   | 96.16  | 96.51         | 96.1       | 94.33 | 93.56  | 94.57  | 93.24      |
|        | 95.85   | 95.04  | 96.17         | 94.6       | 97.32 | 96.01  | 96.65  | 95.53      |
| SNR20  | 97.94   | 97.28  | 96.51         | 97.33      | 97.14 | 96.01  | 96.59  | 95.62      |
|        | 97.67   | 97.22  | 97.56         | 97.18      | 98.03 | 97.52  | 97.33  | 97.01      |

SPEECH RECOGNITION DEVICE, SPEECH RECOGNITION METHOD, AND COMPUTER READABLE MEDIUM

This application is a National Stage Entry of PCT/JP2011/076460 filed Nov. 10, 2011, which claims priority from Japanese Patent Application 2010-252456 filed Nov. 11, 2010, the contents of all of which are incorporated herein by reference, in their entirety.

FIELD OF THE INVENTION

The present invention relates to a speech recognition device, a speech recognition method and a speech recognition program, which are robust to noise.

BACKGROUND OF THE INVENTION

Because the performance of a speech recognition system is remarkably deteriorated by the influence of noise, a method for providing noise-resistance is needed in actual operation of the speech recognition system. The cause of the performance deterioration of a speech recognition system owing to noise is that an input signal used in actual operation does not coincide with voice data used at the time of learning an acoustic model. For the purpose of suppressing this disagreement between the data, if roughly classified, two methods exist as means for providing noise-resistance for the use in speech recognition. One is a method of approximating a distribution produced by an input signal to an acoustic model, by the use of suppression of noise components in the input signal or removal of noise components included in the input signal. Hereafter, this method is referred to as a noise suppression method. The other is a method of approximating an acoustic model to a distribution produced by an input signal, by the use of adaptation of the acoustic model to the same noise environment as that the input signal. Hereafter, this method is referred to as an acoustic model adaptation method.

A noise suppression device described in Patent Document 1 comprises a spectrum transformation means, an S/N estimation means, a suppression coefficient data table, a suppression amount estimation means and a noise suppression means. Then, the noise suppression device operates as follows. The spectrum transformation means transforms an input voice signal including noise from the time domain to the frequency domain. Then, on the basis of the output transformed by the use of the spectrum transformation means, the S/N estimation means estimates an S/N ratio (signal-noise ratio) of the input voice signal. The suppression coefficient data table stores S/N ratio values, frequency components and predetermined values of a suppression coefficient α, in a manner to relate them to each other. From the suppression coefficient data table, the suppression amount estimation means extracts a value of the suppression coefficient α corresponding to the S/N ratio estimated by the S/N estimation means. Then, on the basis of the extracted value of the suppression coefficient α, the noise suppression means suppresses a noise component included in the output transformed by the use of the spectrum transformation means A speech recognition device described in Patent Document 2 suppresses a high noise with a large suppression amount on an input voice signal and detects a voice interval and a noise interval from the input signal suppressed the high noise. Then, the speech recognition device also suppresses a low noise with a low suppression amount on the input signal and generates a noise model from the signal of the part specified by the above-mentioned noise interval within the signal suppressed this low noise. The speech recognition device synthesizes this noise model with a clean voice model. Using the model synthesized as above, the speech recognition device recognizes a voice with respect to the signal of the part specified by the above-mentioned voice interval within the signal suppressed the low noise.

A speech recognition device described in Patent Document 3 suppresses an echo signal included in an input signal on the basis of a signal supplied to a speaker, and, further, suppresses a background noise of the surroundings from the input signal. Then, on the basis of the noise-suppressed signal, the speech recognition device determines a voice interval and a noise interval. Then, on the basis of the signal determined to be a noise interval, the speech recognition device learns a noise model and, by synthesizing the noise model with a clean voice model, generates a noise-superposed voice model. On the basis of the above-mentioned signal determined to be a voice interval and the noise-superposed voice model, the speech recognition device recognizes a voice.

A speech recognition device described in Patent Document 4 stores waveform signal data on a plurality of types of ambient noises for training. Then, from the waveform signal data on ambient noises, the speech recognition device generates a Gaussian mixture model which is a plurality of mixtures in one state in a manner to maximize an output likelihood. Then, from a predetermined Hidden Markov Model (HMM) without noise and the above-mentioned Gaussian mixture model, the speech recognition device generates an acoustic model. This acoustic model satisfies the following conditions. Firstly, in every combined state of individual states, the acoustic model includes a mixed Gaussian distribution for each state which is represented by the sum of linear couplings of individual Gaussian distributions weighted by respective predetermined weighting coefficients. Secondly, this acoustic model is generated on the basis of a Hidden Markov Model in which the mixture weightings of the above-mentioned Gaussian mixture model is adapted by the use of environmental voice data at the time of speech recognition.

Here, also described below are Patent Document 5 and Non-patent Document 1 which will be used in the section "EXEMPLARY EMBODIMENT OF THE INVENTION".

[Patent Document 1] Japanese Patent Application Laid-Open No. 2000-330597
[Patent Document 2] Japanese Patent Application Laid-Open No. 2005-321539
[Patent Document 3] Japanese Patent Application Laid-Open No. 2006-3617
[Patent Document 4] Japanese Patent Application Laid-Open No. 2003-177781
[Patent Document 5] Japanese Patent Publication No. 4282227
[Non-patent Document 1] Hiroshi Matsumoto, "Speech Recognition Techniques for Noisy Environments" The second Forum on Information Technology (FIT2003), pp. 1-4, September 2003.

SUMMARY OF THE INVENTION

Problems to be Solved by the Invention

However, depending on the type of a noise included in an input signal, there is a case in that the performance of speech recognition on an output based on a noise suppression method or an acoustic model adaptation method may be lowered. In other words, for each of the methods, there exists a noise type which lowers the speech recognition rate.

The technology described in Patent Document 1 cannot deal with a type of noise which a noise suppression method cannot deal with well, that is, a type of noise which lowers the speech recognition rate on an output based on the noise suppression method. Therefore, the technology described in Patent Document 1 cannot increase the types of noises which can be dealt with enough to enable speech recognition with a speech recognition rate of high accuracy.

In each of the technologies described in Patent Documents 2 and 3, a simple combination of a noise suppression method or an acoustic model adaptation method are simply combined and used for noise suppression. Therefore, in the technologies described in Patent Documents 2 and 3, when the speech recognition rate on an output on the basis of one of the two methods is low, it is not necessarily the case that the other method may not appropriately contributes to improvement of the speech recognition rate. Namely, the technologies described in Patent Documents 2 and 3 cannot increase the types of noises which can be dealt with enough to enable speech recognition with a speech recognition rate of high accuracy.

The technology described in Patent Document 4 cannot deal with a type of noise which an acoustic model adaptation method cannot deal with well, that is, a type of noise which lowers a speech recognition rate on an output based on the acoustic model adaptation method. Therefore, the technology described in Patent Document 4 cannot increase the types of noises which can be dealt with enough to enable speech recognition with a speech recognition rate of high accuracy.

Because of the reasons described above, each of the above-mentioned related technologies cannot increase the types of noises which can be dealt with enough to enable speech recognition with a speech recognition rate of high accuracy.

An example of a purpose of the present invention is to provide a speech recognition device, a speech recognition method and a speech recognition program which can increase the types of noises which can be dealt with enough to enable speech recognition with a speech recognition rate of high accuracy.

Means for Solving the Problem

A first speech recognition device according to one aspect of the present invention comprises: a coefficient storage means for storing a suppression coefficient representing an amount of noise suppression and an adaptation coefficient representing an amount of adaptation of a noise model which is generated on the basis of a predetermined noise and is synthesized to a clean acoustic model generated on the basis of a voice which does not include noise, in a manner to relate them to each other; a noise estimation means for estimating noise from an input signal; a noise suppression means for suppressing a portion of the noise specified by a suppression amount specified on the basis of the suppression coefficient, among from the noise estimated by the noise estimation means, from the input signal; an acoustic model adaptation means for generating an adapted acoustic model which is noise-adapted, by synthesizing the noise model, which is generated on the basis of the noise estimated by the noise estimation means in accordance with an amount of adaptation specified on the basis of the adaptation coefficient, to the clean acoustic model; and a search means for recognizing voice on the basis of the input suppressed noise by the noise suppression means and the adapted acoustic model generated by the acoustic model adaptation means.

A first speech recognition method according to one aspect of the present invention comprises: storing a suppression coefficient representing an amount of noise suppression and an adaptation coefficient representing an amount of adaptation of a noise model which is generated on the basis of a predetermined noise and is synthesized to a clean acoustic model generated on the basis of a voice which does not include noise, in a manner to relate them to each other; estimating noise from an input signal; suppressing a portion of the noise specified by a suppression amount specified on the basis of the suppression coefficient, among from the noise estimated, from the input signal; generating an adapted acoustic model which is noise-adapted, by synthesizing the noise model, which is generated on the basis of the estimated noise in accordance with an amount of adaptation specified on the basis of the adaptation coefficient, to the clean acoustic model; and recognizing voice on the basis of the noise-suppressed input signal and the generated adapted acoustic model.

A first computer readable medium embodying a program, the program causing a speech recognition device to perform a method, said method comprising: storing a suppression coefficient representing an amount of noise suppression and an adaptation coefficient representing an amount of adaptation of a noise model which is generated on the basis of a predetermined noise and is synthesized to a clean acoustic model generated on the basis of a voice which does not include noise, in a manner to relate them to each other; estimating noise from an input signal; suppressing a portion of the noise specified by a suppression amount specified on the basis of the suppression coefficient, among from the noise estimated, from the input signal; generating an adapted acoustic model which is noise-adapted, by synthesizing the noise model, which is generated on the basis of the estimated noise in accordance with an amount of adaptation specified on the basis of the adaptation coefficient, to the clean acoustic model; and recognizing voice on the basis of the noise-suppressed input signal and the generated adapted acoustic model.

Effect of the Invention

An example of an advantageous effect of the present invention is that it becomes possible to increase the types of noises which can be dealt with enough to enable speech recognition with a speech recognition rate of high accuracy.

BRIEF DESCRIPTION OF THE DRAWINGS

FIG. 5 is a table showing an example of information stored in a clean acoustic model storage unit.

FIG. 6 is a table showing an example of information stored in an estimated noise storage unit.

FIG. 7 is a table showing an example of information stored in an adapted acoustic model storage unit.

FIG. 9 is a table showing an example of information stored in a training signal storage unit.

FIG. 10 is a table showing an example of information stored in a noise-suppressed signal storage unit.

FIG. 19 is a table showing speech recognition rates of eight types of noises of AURORA2 by the noise suppression methods and the model adaptation methods in the related technologies.

EXEMPLARY EMBODIMENT OF THE INVENTION

Figure 1:
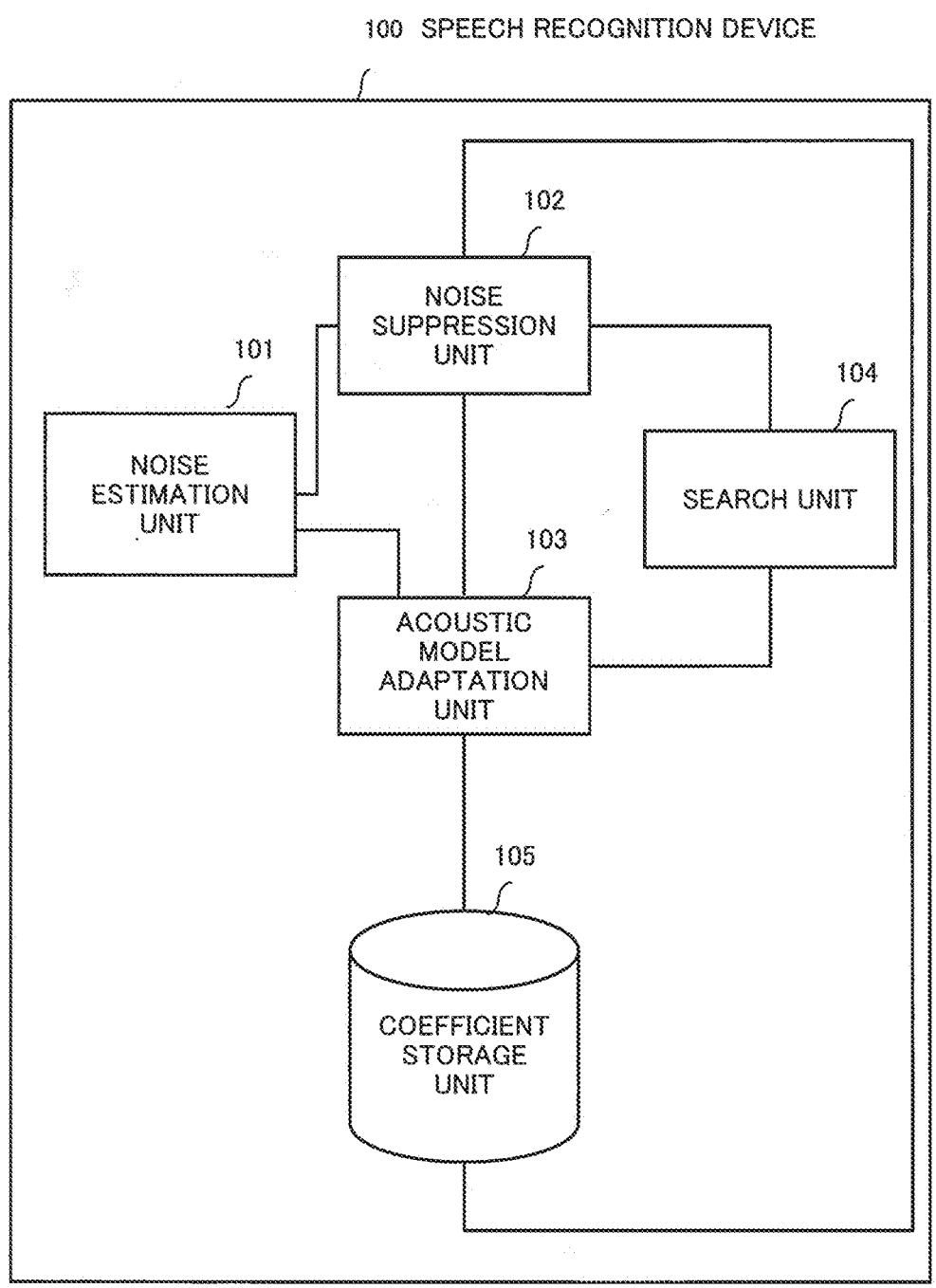
FIG. 1 is a block diagram showing a configuration of a speech recognition device according to a first exemplary embodiment.

Exemplary embodiments of the present invention will be described in detail with reference to drawings. In addition, in the drawings and the exemplary embodiments described in the present specification, there may be a case where an identical sign is given to components comprising an identical function and their descriptions are omitted.

First Exemplary Embodiment

FIG. 1 is a block diagram showing a configuration of a speech recognition device 100 according to a first exemplary embodiment of the present invention. Referring to FIG. 1, the speech recognition device 100 includes a coefficient storage unit 105, a noise estimation unit 101, a noise suppression unit 102, an acoustic model adaptation unit 103 and a search unit 104.

The speech recognition device 100 according to the first exemplary embodiment stores a suppression coefficient and an adaptation coefficient specified on the basis of the suppression coefficient, in a manner to relate them to each other. The speech recognition device 100 estimates noise from an input signal. Then, the speech recognition device 100 suppresses a portion of the noise specified by a suppression amount specified on the basis of the above-described suppression coefficient among from the above-described noise from the input signal. And, the speech recognition device 100 generates an adapted acoustic model which is noise-adapted on the basis of synthesizing a noise model generated on the basis of the estimated noise which is described above in accordance with the amount of adaptation specified on the basis of the above-described adaptation coefficient, to the clean acoustic model. Then, the speech recognition device 100 recognizes voice on the basis of the input signal which has been suppressed the above-described noise and the adapted acoustic model generated as above.

Therefore, because the speech recognition device 100 according to the first exemplary embodiment suppresses noise on the basis of appropriately combining the noise suppression method and the acoustic model adaptation method, it can increase the types of noises which can be dealt with enough to enable speech recognition with a speech recognition rate of high accuracy.

Hereinafter, each component comprised in the speech recognition device 100 will be described.

===Coefficient Storage Unit 105===

The coefficient storage unit 105 stores the suppression coefficient and the adaptation coefficient in a manner to relate them to each other.

The suppression coefficient is information representing an amount of noise suppression. For example, when the suppression coefficient is 1, a signal estimated to be a noise by the noise suppression unit 102, which will be described later, is wholly suppressed. On the other hand, when the suppression coefficient is 0, a signal estimated to be a noise by the noise suppression unit 102 is not suppressed.

The suppression coefficient may be a scalar or a matrix. And, the suppression coefficient may also be information representing a rate of contribution to noise suppression. In this case, when the suppression coefficient is a scalar, it takes a value from 0 to 1. Alternatively, when the suppression coefficient is a matrix, each component of the matrix takes a value from 0 to 1.

The adaptation coefficient is information representing an amount of adaptation of the noise model synthesized to the clean acoustic model. For example, when the adaptation coefficient is 1, the acoustic model adaptation unit 103, which will be described later, generates an adapted acoustic model by synthesizing the clean acoustic model and the noise model without particularly multiplying a weight to the noise model. On the other hand, when the adaptation coefficient is 0, the acoustic model adaptation unit 103, which will be described later, generates an adapted acoustic model by giving a weight of 0 to the noise model by synthesizing the clean acoustic model and the noise model with multiplying weight 0 to the noise model. That is, in this case, the acoustic model adaptation unit 103 generates an adapted acoustic model by regarding the clean acoustic model as the adapted acoustic model.

The adaptation coefficient may be a scalar or a matrix. And, the adaptation coefficient may also be information representing a rate of contribution to the adaptation in model synthesis. In this case, when the adaptation coefficient is a scalar, it takes a value from 0 to 1. Alternatively, when the adaptation coefficient is a matrix, each component of the matrix takes a value from 0 to 1.

The suppression coefficient and the adaptation coefficient each may be a value which is empirically determined on the basis of an experiment performed in advance or the like. For example, when a noise to be dealt with in actual operation of the speech recognition device 100 is a noise which is easy for the noise suppression unit 102 to estimate, the suppression coefficient may be a large value. Then, in this case, the adaptation coefficient may be a small value. Alternatively, it is desirable that the sum of the suppression coefficient and the adaptation coefficient takes a predetermined value. That is, the adaptation coefficient may be a value calculated on the basis of the suppression coefficient. For example, when the suppression coefficient and the adaptation coefficient are both scalar, it is preferable that the above-mentioned predetermined value is 1 or a value close to 1. On the other hand, when the suppression coefficient and the adaptation coefficient are matrices, it is preferable that the above-mentioned predetermined value is a unit matrix I or a matrix similar to I. Here, the "matrix similar to I" may be a matrix for which the squared sum of the differences of respective matrix components between the matrix and I is equal to or smaller than a predetermined threshold value. However, this is just an example, and the "matrix similar to I" is not limited to this.

===Noise Estimation Unit 101===

The noise estimation unit 101 estimates a noise component from time series data of an input signal. The input signal may be information cut out in terms of frames of a unit of time. Alternatively, an input unit not illustrated in the drawing may cut out the time series data of an input signal in terms of frames of a unit of time and transfer each piece of the cut-out data to the noise estimation unit 101.

The noise estimation unit 101 extracts a feature y of the input signal from the input signal. For example, the noise estimation unit 101 may multiply a power spectrum transformed for each frame of the input signal by a matrix of a mel-filter bank and, further, calculate a logarithmic mel-spectrum corresponding to the input signal by using a logarithm of the result. Alternatively, the noise estimation unit 101 may extract a feature of the input signal by using other methods. For example, the noise estimation unit 101 may extract a logarithm of a power spectrum transformed from the input signal as a feature.

And, the noise estimation unit 101 extracts a feature n' of the estimated noise from the estimated noise component. For example, the noise estimation unit 101 may extract the feature n' of the estimated noise using the same method as that for extracting a feature of the input signal.

===Noise Suppression Unit 102===

The noise suppression unit 102 suppresses a portion of noise specified by the suppression amount specified on the basis of the suppression coefficient stored in the coefficient storage unit 105 from the input signal. Then, the noise suppression unit 102 extracts a feature of the noise-suppressed signal which is a suppressed signal, and outputs the feature of the noise-suppressed signal.

===Acoustic Model Adaptation Unit 103===

The acoustic model adaptation unit 103 adapts acoustic model to the clean acoustic model by controlling an amount of adaptation in accordance with the adaptation coefficient stored in the coefficient storage unit 105. Then, the acoustic model adaptation unit 103 generates an adapted acoustic model which is adapted to the acoustic model.

===Search Unit 104===

The search unit 104 compares the distance between the feature of the noise-suppressed signal outputted by the noise suppression unit 102 and a probability density function for each phoneme included in the adapted acoustic model which is adapted by the acoustic model adaptation unit 103, and searches for a word sequence corresponding to the input signal.

Figure 2:
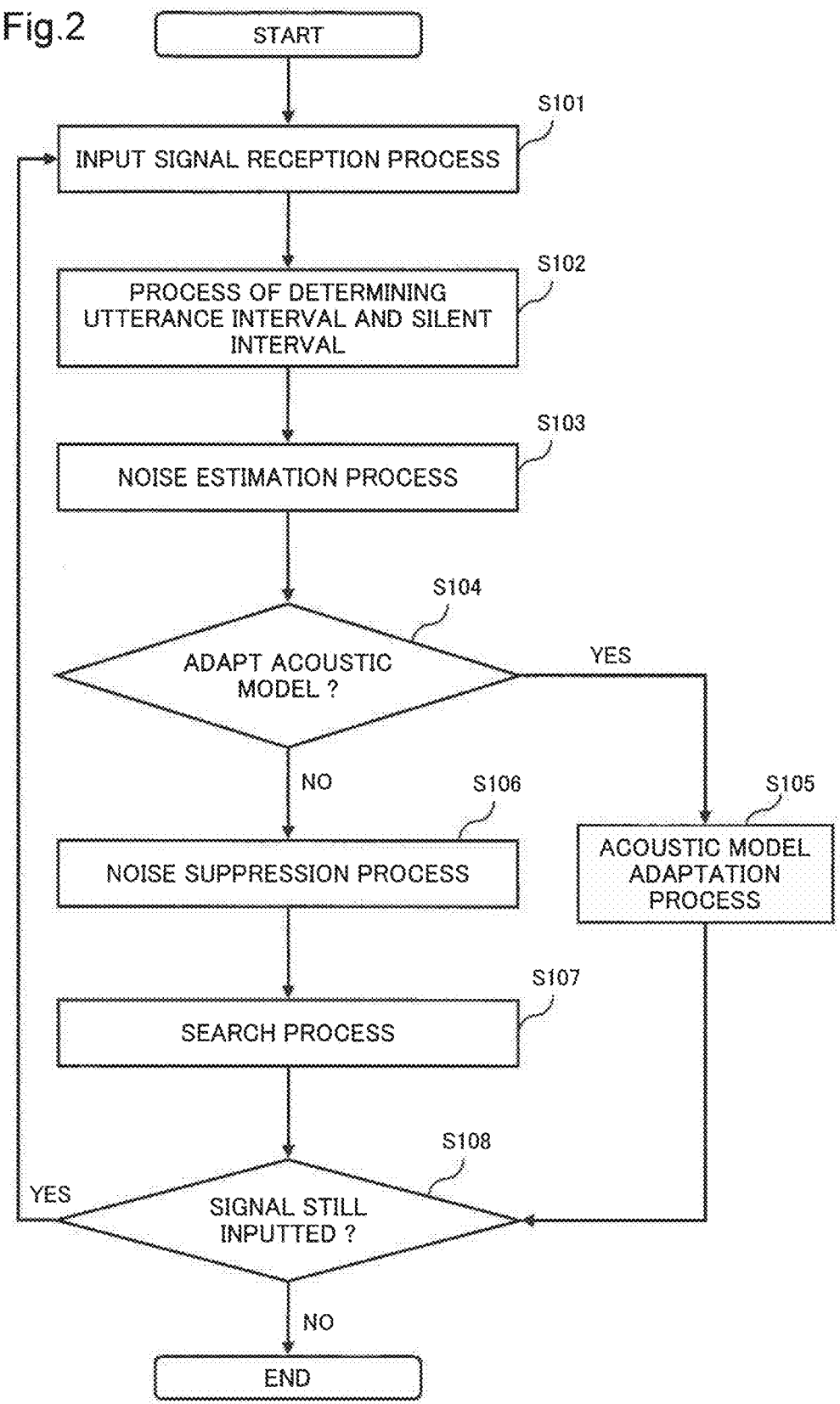
FIG. 2 is a flow chart illustrating an outline of operation of a speech recognition device according to the first exemplary embodiment.

FIG. 2 is a flow chart illustrating an outline of operation of the speech recognition device 100 according to the first exemplary embodiment of the present invention.

Figure 3:
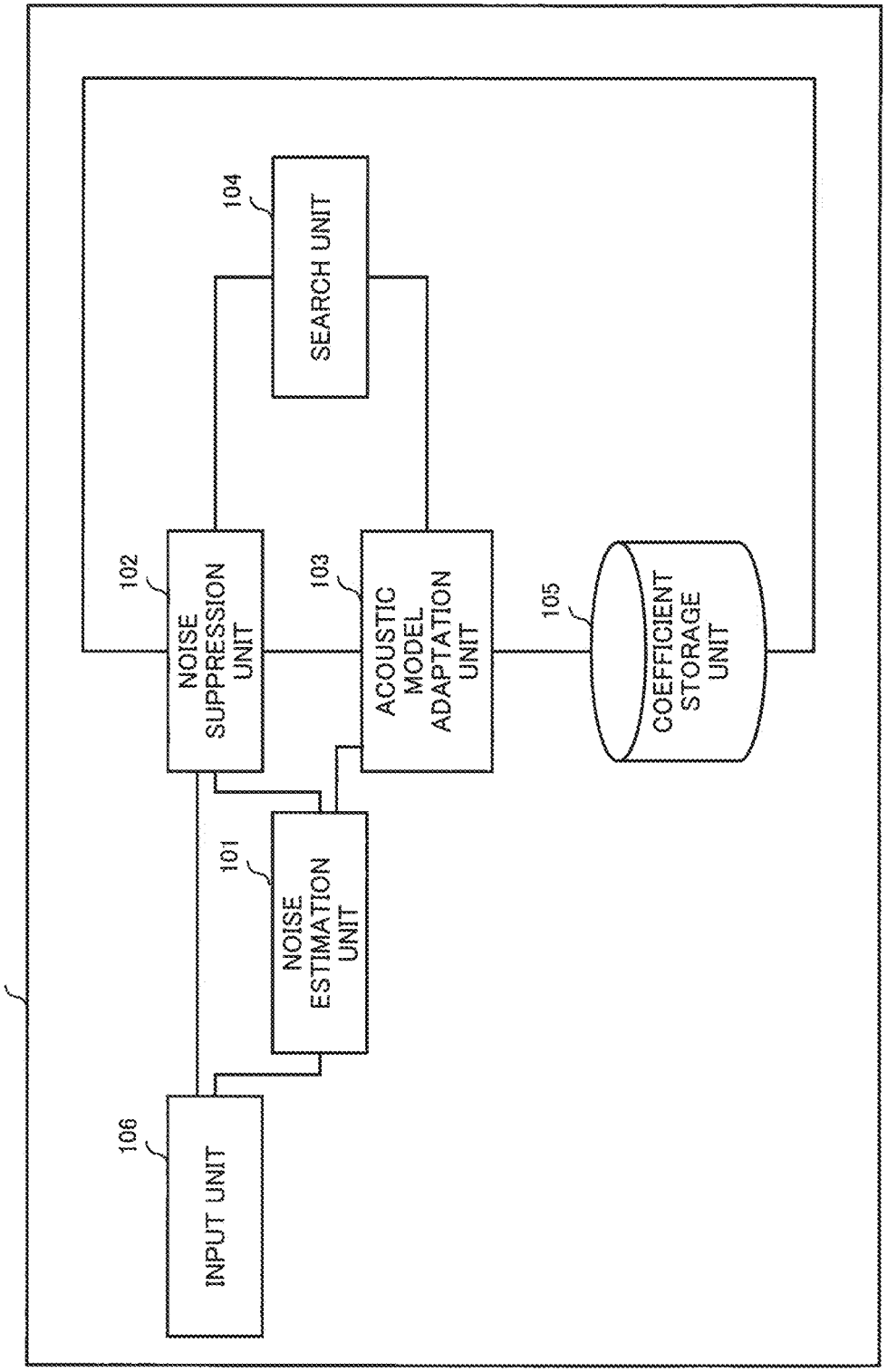
FIG. 3 is a block diagram showing an example of a configuration of a speech recognition device including an input unit according to the first exemplary embodiment.

The noise estimation unit 101 receives the input signal (step S101). For example, it is supposed the case where the input signal is a 16-bit Linear-PCM (Linear Pulse Code Modulation) signal with a sampling frequency of 8000 Hz. In this case, the input signal contains waveform data on 8000 points per second. For example, the input unit, which is not illustrated in the drawing, successively cuts out waveform data in terms of a frame width of 200 points (25 m sec) and a frame shift of 80 points (10 m sec) in accordance with the time series. Then, the input unit performs a short-term discrete Fourier transform on the cut-out data. Then, the input unit transforms the transformed data into a power spectrum. The input unit may transfer the transformed power spectrum to the noise estimation unit 101. The operation of the input unit is just an example, and does not limit the above described operation. FIG. 3 is a block diagram showing an example of a configuration of the speech recognition device 100 comprising this input unit 106.

Next, the noise estimation unit 101 determines a voice interval and a silent interval using voice detection from the received input signal respectively (step S102). Each interval regarded as a voice interval is specified as one utterance respectively. As a specific method of the voice detection, there are, for example, the following two methods.

A first method is the method which, on the basis of a power spectrum of the input signal, regards an interval giving a power spectrum equal to or larger than a predetermined threshold value as a voice interval and, on the other hand, regards an interval giving a power spectrum smaller than the predetermined threshold value as a silent interval.

A second method is a voice interval detection method based on a Gaussian mixture model (GMM). First, the speech recognition device 100 defines GMMs for voice and non-voice. Then, the noise estimation unit 101 extracts a feature for each frame of the input signal. Then, the noise estimation unit 101 calculates a likelihood of each GMM from the extracted features. Then, the noise estimation unit 101 determines whether a voice interval or a silent interval on the basis of a ratio of the likelihood with GMM for voice and GMM for non-voice.

Next, the noise estimation unit 101 estimates a noise component from the received input signal (step S103). The noise estimation unit 101 estimates a noise component from the received input signal by the use of, for example, an existing noise estimation method. The existing noise estimation method is, for example, any one of methods mentioned below.

A first method is the method which estimates noise using the average of the input signal in a non-voice interval (a silent interval) before the targeted voice is uttered. A second method is the method which estimates a non-voice interval on the basis of an estimated SNR (signal-noise ratio) and estimates a constant noise (for example, a method described in Patent Document 5).

The estimated noise which is estimated by the noise estimation unit 101 is used at the noise suppression unit 102.

The acoustic model adaptation unit 103 determines whether or not to adapt acoustic model to the clean acoustic model (step S104). For example, the acoustic model adaptation unit 103 may adapt the acoustic model in terms of each utterance determined by the noise estimation unit 101.

Alternatively, the acoustic model adaptation unit 103 may adapt acoustic model when it determines that the environment changes. Specifically, the acoustic model adaptation unit 103 may determine whether or not to adapt the acoustic model using the following method.

It is assumed that a static average and a static variance of a set $\Lambda_n$ including the static average and the static variance of the estimated noise estimated by the noise estimation unit 101 are represented by $\mu_n$ and $\Sigma_n$, respectively. And, it is also assumed that a static average and a static variance of a parameter $\Lambda_z$ of the acoustic model of when the acoustic model adaptation unit 103 has adapted the acoustic model last time are represented by $\mu'_n$ and $\Sigma'_n$, respectively. In this case, the speech recognition device 100 defines a predetermined distance based on each of the noise statistics, that is, the static average and the static variance in advance. The acoustic model adaptation unit 103 calculates this distance. When the calculated distance is equal to or larger than a predetermined threshold value, that is, when determining that the noise statistics changes more than a certain value, the acoustic model adaptation unit 103 determines that the environment changes. Then, the acoustic model adaptation unit 103 determines to adapt the acoustic mode when it determines that the environment changes. In this case, the acoustic model adaptation unit 103 may specify the static average $\mu_n$ and the static variance $\Sigma_n$ of the set $\Lambda_n$ including the static average and the static variance of the estimated noise on the basis of the estimated noise estimated by the noise estimation unit 101.

When the acoustic model adaptation unit 103 determines to adapt the acoustic model ("Yes" at the step S104), the acoustic model adaptation unit 103 performs a following process.

That is, the acoustic model adaptation unit 103 adapts the acoustic model to the clean acoustic model by controlling an amount of adaptation on the basis of the adaptation coefficient stored in the coefficient storage unit 105 (step S105). Hereafter, the acoustic model adapted by the acoustic model adaptation unit 103 is referred to also as an adapted acoustic model. That is, the acoustic model adaptation unit 103 generates the adapted acoustic model. For example, it is assumed that a parameter of the clean acoustic model is represented by $\Lambda_x$, and a parameter of the adapted acoustic model which is noise-adapted by the acoustic model adaptation unit 103 is represented by $\Lambda_z$. And, it is also assumed that the adaptation coefficient of the set $\Lambda_n$ including the static average and the static variance of the estimated noise estimated by the noise estimation unit 101 is $\beta$. The static average and the static variance of the estimated noise estimated by the noise estimation unit 101 may be values calculated on the basis of an estimated noise which is estimated in the period from time when the acoustic model adaptation unit 103 adapts the acoustic model at last time when it adapts at this time. The adaptation coefficient $\beta$ may be a scalar or a matrix. In this time, the parameter $\Lambda_z$ of the adapted acoustic model described above is expressed by a following equation 1, based on the parameter set $\Lambda_x$ of the clean acoustic model, the adaptation coefficient $\beta$ and the set $\Lambda_n$ including the static average and the static variance of the estimated noise estimated by the noise estimation unit 101.

$$\Lambda_z = M(\Lambda_x, \Lambda_n, \beta)$$ [Equation 1]

In the equation 1, M is a function representing model adaptation. This function M is determined on the basis of a method of acoustic model adaptation. As a method of acoustic model adaptation, the HMM synthesis method, the Jacobian method and the Vector Talyer Series method (VTS method) and the like are known.

The HMM method is a method which synthesizes an HMM generated from a clean voice (hereafter, this HMM is referred to also as a "clean HMM") in advance with an HMM generated from an estimated noise, that is, an HMM of a voice generated in the target noise environment. As one HMM method, for example, there is a Parallel Model Combination method (also referred to as a PMC method). The PMC method inversely transforms the features into quantities in the spectrum domain and synthesizes the above-described two HMMs in the spectrum domain.

The Jacobian method and the VTS method are methods which approximate a change of each distribution constituting a clean HMM under a noise environment by a linear equation on the basis of an estimated noise.

In the present specification, an example of the function M of the case that the VTS method is adopted is shown as a method of the acoustic model adaptation. It is assumed that the parameter $\Lambda_z$ of the adapted acoustic model generated by the acoustic model adaptation unit 103 comprises six parameters $\mu_{zij}$, $\Delta\mu_{zij}$, $\Delta\Delta\mu_{zij}$, $\Sigma_{zij}$, $\Delta\Sigma_{zij}$ and $\Delta\Delta\Sigma_{zij}$. Here, $\mu_{zij}$ represents the static average of a normal distribution of an HMM. $\Delta\mu_{zij}$ represents the first-order dynamic average of the normal distribution of the HMM. $\Delta\Delta\mu_{zij}$ represents the second-order dynamic average of the normal distribution of the HMM. $\Sigma_{zij}$ represents the static variance of the normal distribution of the HMM. $\Delta\Sigma_{zij}$ represents the first-order dynamic variance of the normal distribution of the HMM. $\Delta\Delta\Sigma_{zij}$ represents the second-order dynamic variance of the normal distribution of the HMM. The i represents the state number of the HMM and the j represents Gaussian number, respectively. It is also assumed that, similarly to $\Lambda_z$, the parameter $\Lambda_x$ of the clean acoustic model also comprises six parameters $\mu_{xij}$, $\Delta\mu_{xij}$, $\Delta\Delta\mu_{xij}$, $\Delta\Sigma_{xij}$, $\Delta\Sigma_{xij}$ and $\Delta\Delta\Sigma_{xij}$. It is assumed that the static average and the static variance of the set $\Lambda_n$ including the static average and the static variance of an estimated noise are represented by $\mu_n$ and $\Sigma_n$, respectively. And, it is assumed that the first-order dynamic variances and the second-order dynamic variances of the set $\Lambda_n$ are represented by $\Delta\Sigma_n$ and $\Delta\Delta\Sigma_n$, respectively. On the basis of these parameters, the adapted acoustic model $\Lambda_z$ is expressed by following six equations from equation 2 to equation 7.

$$\mu_{zij}(\beta) = \mu_{xij} + \beta g(\mu_{xij}, \mu_n)$$ [Equation 2]

$$\Delta\mu_{zij}(\beta) = (I - \beta G)\Delta\mu_{xij}$$ [Equation 3]

$$\Delta\Delta\mu_{zij}(\beta) = (I - \beta G)\Delta\Delta\mu_{xij}$$ [Equation 4]

$$\Sigma_{zij}(\beta) = (I - \beta G)\Sigma_{xij}(I - \beta G)^T + \beta G \Sigma_n (\beta G)^T$$ [Equation 5]

$$\Delta\Sigma_{zij}(\beta) = (I - \beta G)\Delta\Sigma_{xij}(I - \beta G)^T + \beta G \Delta\Sigma_n (\beta G)^T$$ [Equation 6]

$$\Delta\Delta\Sigma_{zij}(\beta) = (I - \beta G)\Delta\Delta\Sigma_{xij}(I - \beta G)^T + \beta G \Delta\Delta\Sigma_n (\beta G)^T$$ [Equation 7]

The $g(\mu_{xij}, \mu_n)$ in the equation 2 is expressed by a following equation 8. The function g is a function representing a gain in the feature domain.

$$g(\mu_{xij}, \mu_n) = \log(1 + \exp(\mu_n - \mu_{xij}))$$ [Equation 8]

In the equation 3 to the equation 7, G represents the Jacobian of the function g at $\mu_n$. And, in the equation 3 to the equation 7, I represents a unit matrix. In the equation 5 to the equation 7, "$*^T$" represents transposition of the matrix. In the equation 8, for simplification, each of the features used in speech recognition is assumed to be a value derived by simply calculating a logarithm of a power spectrum. These features each may be a value which is obtained by performing a discrete cosine transform on a value derived by calculating a logarithm of a power spectrum.

After the step S105, the speech recognition device 100 proceeds to a step S108.

On the other hand, in the step S104, when the acoustic model adaptation unit 103 determines not to adapt the acoustic model ("No" at the step S104), the noise suppression unit 102 performs a following process. That is, the noise suppression unit 102 generates the noise-suppressed signal by adapting noise suppression controlled the amount of noise suppression to the input signal on the basis of the input signal, the estimated noise estimated by the noise estimation unit 101 and the suppression coefficient stored in the coefficient storage unit 105. Then, the noise suppression unit 102 extracts the feature of the noise-suppressed signal from the noise-suppressed signal which is generated, and outputs the extracted feature of the noise-suppressed signal (step S106).

And, the noise suppression unit 102 extracts the feature y of the input signal from the input signal. For example, the noise suppression unit 102 may multiply a power spectrum transformed for each frame of the input signal by a matrix of a mel-filter bank and calculate a logarithmic mel-spectrum corresponding to the input signal by using a logarithm of the multiplication result. Alternatively, the noise suppression unit 102 may extract the feature of the input signal using other methods. For example, the noise suppression unit 102 may extract a logarithm of a power spectrum transformed from the input signal as the feature.

And, the noise suppression unit 102 extracts also the feature n' of the estimated noise from an estimated noise component. For example, the noise suppression unit 102 may extract the feature n' of the estimated noise using the same method as that of the extraction of a feature of the input signal.

For example, when the feature of the input signal is represented by y, the feature of the estimated noise is represented by n' and the suppression coefficient is represented by a, a feature z of the noise-suppressed signal generated by the noise suppression unit 102 is expressed by a following equation 9.

$$z = F(y, n', \alpha) \quad \text{[Equation 9]}$$

In the equation 9, F is a function representing noise suppression. This function F is determined on the basis of the method of noise suppression. As a method of noise suppression, there are a spectrum subtraction method (hereafter, referred to as an SS method), a Wiener Filter method (hereafter, referred to as a WF method) and the like (refer to, for example, Non-patent Document 1). A power spectrum of the input signal suppressed noise by using an SS method is expressed by a following equation 10.

$$\hat{X}_{SS}^2 = \max[Y^2 - N^2, \gamma] \quad \text{[Equation 10]}$$

The equation 10 is defined for each frequency band or sub-band. In addition, the left-hand side of the equation 10, which is expressed by an equation 11, represents a power spectrum of a noise-suppressed voice.

$$\hat{X}_{SS}^2 \quad \text{[Equation 11]}$$

And, in the equation 10, $Y^2$ represents a power spectrum of the input signal, and $N'^2$ represents a power spectrum of the estimated noise. The max [*, *] is a function which takes a larger value between the arguments. And, the γ is a flooring coefficient. It is preferable that the flooring coefficient γ is set to be appropriate according to a noise type and an S/N ratio.

And, the input signal suppressed noise by using a WF method is expressed by a following equation 12.

$$\hat{X}_{WF}^2 = G_{WF}^{-1}(D'^2, N'^2) Y^2 \quad \text{[Equation 12]}$$

The left-hand side of the equation 12, which is expressed by a following equation 13, represents the input signal suppressed noise by using a WF method.

$$\hat{X}_{WF}^2 \quad \text{[Equation 13]}$$

And, in the equation 12, $G_{WF}^{-1}$ represents a Wiener gain. The specific formula of the Wiener gain is expressed by a following equation 14.

$$G_{WF}(D'^2, N'^2) = \frac{D'^2 + N'^2}{D'^2} \quad \text{[Equation 14]}$$

$$G_{WF}^{-1}(D'^2, N'^2) = \frac{D'^2}{D'^2 + N'^2}$$

In the equation 14, $D'^2$ represents a pseudo-estimated voice, and $N'^2$ represents a power spectrum of the estimated noise. In addition, as a method of estimating a pseudo-estimated voice, there are those mentioned below.

A first method is the method which estimates a pseudo-estimated voice using an SS method. A second method is a MBW (Model-Based Wiener Filter) method which estimates using a GMM trained from a clean signal.

For example, the noise suppression unit 102 may calculate the pseudo-estimated voice D' using a following equation 15.

$$D_t'^2 = \eta G_{WF,t-1}^{-1} Y_{t-1}^2 + (1-\eta) \max[Y_t^2 - N_t^2, 0] \quad \text{[Equation 15]}$$

In the equation 15, t is a frame number enabling identification of each of the frames into which the input signal is divided. $Y_t$ is a power spectrum of the input signal at a frame number t. $N_t$ is a power spectrum of the estimated noise at a frame number t. The is a predetermined coefficient.

The noise suppression unit 102 extracts a feature d' of the pseudo-estimated voice from the pseudo-estimated voice calculated on the basis of the equation 15. For example, the noise suppression unit 102 may extract the feature quantity d' of the pseudo-estimated voice using the same method as that of the extraction of the feature of the input signal.

In the present specification, an example of the function F of the case where a WF method is adopted as the method of noise suppression is shown. The feature z of the noise-suppressed signal generated by the noise suppression unit 102 is expressed by a following equation 16.

$$z = y - \alpha g(d', n') \quad \text{[Equation 16]}$$

In the equation 16, a function g is the same function as g in the equation 8. And, in the equation 16, d' is the feature of the pseudo-estimated voice. A first-order dynamic feature Δz and a second-order dynamic feature ΔΔz are derived from z in the equation 16. For example, Δz and ΔΔz are calculated by a following equation 17.

$$\Delta z_t = \frac{\sum_{\tau=-\theta}^{\theta} \tau z_{t-\tau}}{\sum_{\tau=-\theta}^{\theta} \tau^2} \quad \text{[Equation 17]}$$

$$\Delta\Delta z_t = \frac{\sum_{\tau=-\theta}^{\theta} \tau \Delta z_{t-\tau}}{\sum_{\tau=-\theta}^{\theta} \tau^2}$$

In the equation 17, t is a frame number enabling identification of each of the frames into which the input signal is divided. And, in the equation 17, a value of θ is usually 3 in the calculation of Δz, and 2 in that of ΔΔz.

The search unit 104 compares the distance between the feature of the noise-suppressed signal outputted by the noise suppression unit 102 and a probability density function for each phoneme included in the adapted acoustic model which is adapted by the acoustic model adaptation unit 103, and searches for a word sequence corresponding to the input signal (step S107).

The noise estimation unit 101 determines whether a signal is still inputted or not (Step S108). For example, the noise estimation unit 101 may determine whether a signal is still inputted or not on the basis of whether or not the silent interval detected in the step S102 has continued for a predetermined time period.

When the noise estimation unit 101 determines that a signal is not inputted ("No" at the step S108), the speech recognition device 100 ends the operation. On the other hand, when the noise estimation unit 101 determines that a signal is still inputted ("Yes" at the step S108), the speech recognition device 100 returns to the step S101.

The speech recognition device 100 according to the first exemplary embodiment stores a suppression coefficient and an adaptation coefficient specified on the basis of the suppression coefficient, in a manner to relate them to each other. The speech recognition device 100 estimates noise from the input signal. Then, the speech recognition device 100 suppresses a portion of noise specified the suppression amount specified on the basis of the above-mentioned suppression coefficient among from the above-mentioned estimated noise from the input signal. And, the speech recognition device 100 synthesizes a noise model generated on the basis of the above-mentioned estimated noise in accordance with an amount of adaptation specified on the basis of the above-mentioned adaptation coefficient to a clean acoustic model, and generates the adapted acoustic model which is adapted to the noise. Then, the speech recognition device 100 recognizes voice on the basis of the above-described noise-suppressed input signal and the adapted acoustic model generated as above.

Therefore, because the speech recognition device 100 according to the first exemplary embodiment suppresses noise on the basis of an appropriate combination of the noise suppression method and the acoustic model adaption method, it can increase the types of noises which are dealt with enough to enable speech recognition with a speech recognition rate of high accuracy.

And, the speech recognition device 100 according to the first exemplary embodiment can appropriately set the contribution rates of the noise suppression method and the model adaption method, respectively, to noise resistance by the use of the suppression coefficient $\alpha$ and the adaptation coefficient $\beta$. For example, in general, the noise estimation is difficult when short term variation of noise included in the input signal is large. In this case, the speech recognition device 100 according to the first exemplary embodiment provides the suppression coefficient and the adaptation coefficient in a manner to decrease the contribution rate of the noise suppression method to noise resistance and increase the contribution rate of the acoustic model adaptation method to noise resistance. That is, the speech recognition device 100 decreases the value of the suppression coefficient $\alpha$ and increases the value of the adaptation coefficient $\beta$. In the opposite case where an input signal includes noise easy to estimate, the speech recognition device 100 increases the contribution rate of the noise suppression method to noise resistance and decreases the contribution rate of the acoustic model adaptation method to noise resistance.

Based on these operations, the speech recognition device 100 according to the first exemplary embodiment can increase the types of noises it can deal with. Moreover, because combination of the noise suppression method and the acoustic model adaption method becomes possible, the speech recognition device 100 according to the first exemplary embodiment becomes capable of simultaneous use of functions for noise resistance of the noise suppression method and the acoustic adaption model.

First Modified Example of the First Exemplary Embodiment

Figure 4:
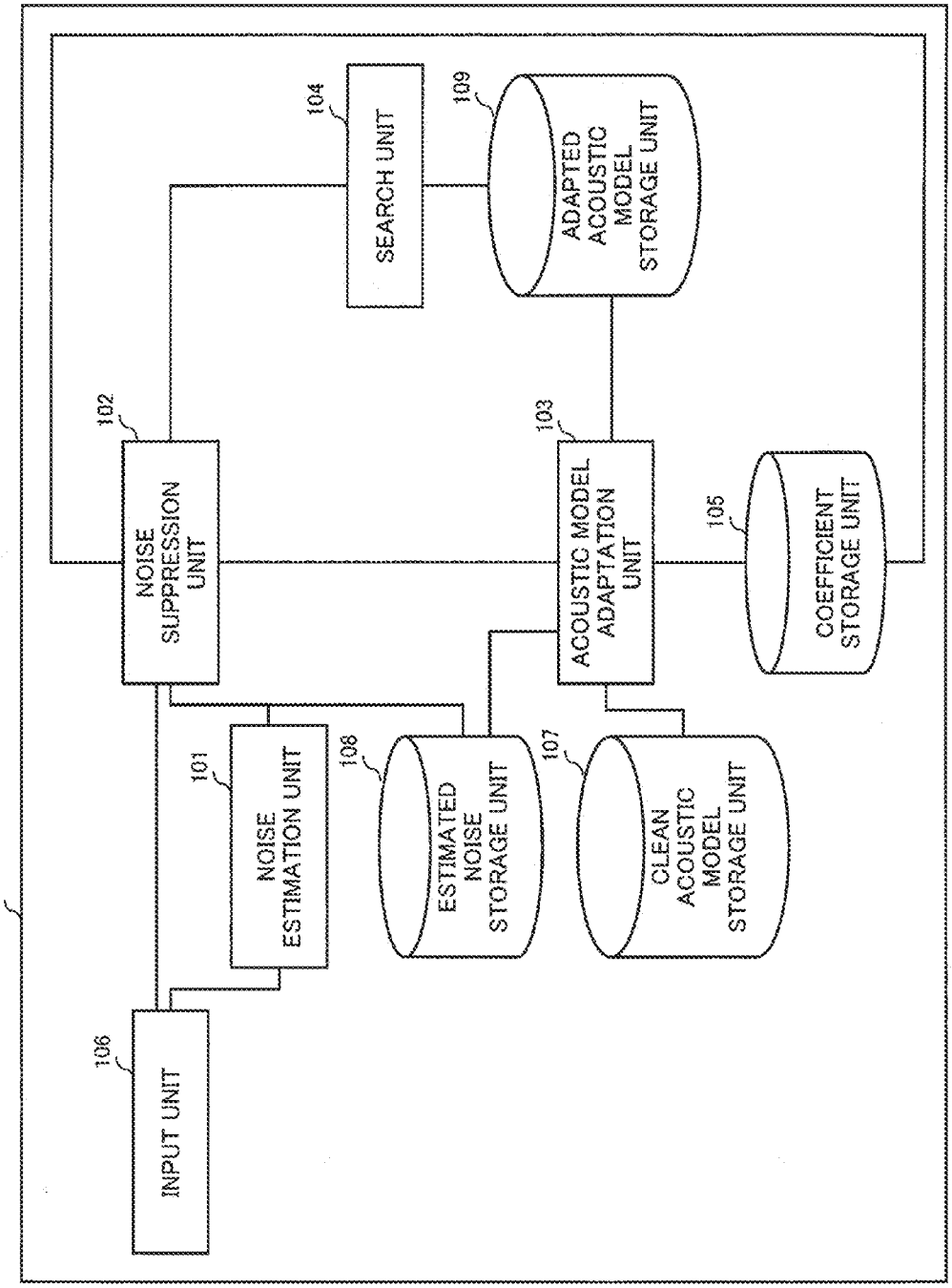
FIG. 4 is a block diagram showing a configuration of a speech recognition device according to a first modified example of the first exemplary embodiment.

In the first exemplary embodiment, the speech recognition device 100 may include an input unit 106, a clean acoustic model storage unit 107, an estimated noise storage unit 108 and an adapted acoustic model storage unit 109. FIG. 4 is a block diagram showing a configuration of a speech recognition device 100 according to the first modified example of the first exemplary embodiment of the present invention.

===Input Unit 106===

On receiving an input signal, the input unit 106 cuts out the input signal successively according to the time series. Then, the input unit 106 performs short-term discrete Fourier transform on the cut-out data. Then, the input unit 106 transforms the transformed data into a power spectrum. The input unit 106 transfers the transformed power spectrum to the noise estimation unit 101 and the noise suppression unit 102.

The noise estimation unit 101 estimates the noise component from the data received from the input unit 106. And, the noise suppression unit 102 suppresses apportion of noise specified by the suppression amount which is specified on the basis of the suppression coefficient stored in the coefficient storage unit 105 from the input signal received from the input unit 106.

===Clean Acoustic Model Storage Unit 107===

The clean acoustic model storage unit 107 stores information representing a clean acoustic model which is trained on the basis of a clean signal which does not include noise. FIG. 5 is a table showing an example of information stored in the clean acoustic model storage unit 107. Referring to FIG. 5, the clean acoustic model storage unit 107 stores, as a clean acoustic model $\Lambda_x$, a pair of a state number i and a Gaussian number j, a static average $\mu_{xij}$, a first-order dynamic average $\Delta\mu_{xij}$, a second-order dynamic average $\Delta\Delta\mu_{xij}$, a static variance $\Sigma_{xij}$, a first-order dynamic variance $\Delta\Sigma_{xij}$ and a second-order dynamic variance $\Delta\Delta\Sigma_{xij}$, in a manner to relate them to each other.

The acoustic model adaptation unit 103 uses the clean acoustic model $\Lambda_x$ stored in the clean acoustic model storage unit 107 when it determines to adapt the acoustic model. Specifically, the acoustic model adaptation unit 103 generates the adapted acoustic model by adapting acoustic model on this clean acoustic model $\Lambda_x$ by controlling the amount of adaptation on the basis of the adaptation coefficient stored in the coefficient storage unit 105.

===Estimated Noise Storage Unit 108===

The estimated noise storage unit 108 stores information representing the estimated noise estimated by the noise estimation unit 101. FIG. 6 is a table showing an example of information stored in the estimated noise storage unit 108. Referring to FIG. 6, the estimated noise storage unit 108 stores time information, a feature of the estimated noise and a noise statistics $\Lambda_n$, in a manner to relate them to each other. The time information is information representing a time. The feature of the estimated noise is a feature of the estimated noise extracted by the noise suppression unit 102. The noise statistics $\Lambda_n$ is information including a static average $\mu_n$, a static variance $\Sigma_{nij}$, a first-order dynamic variance $\Delta\Sigma_{nij}$ and a second-order dynamic variance $\Delta\Delta\Sigma_{nij}$.

The noise estimation unit 101 may extract the feature of the estimated noise on the basis of the estimated noise which it estimates. The noise estimation unit 101 may extract the feature of estimated noise similarly to the feature extraction from the estimated noise performed in the noise suppression unit 102. Further, the noise estimation unit 101 may calculate statistics of the noise on the basis of the extracted feature, and store the calculated noise statistics into the estimated noise storage unit 108.

The acoustic model adaptation unit 103 calculates parameters of the adapted acoustic model on the basis of the statistics of the estimated noise $\Lambda_n$ stored in the estimated noise storage unit 108. The calculation method of parameters of the adapted acoustic model is the same as that of the adapted acoustic model according to the first exemplary embodiment.

===Adapted Acoustic Model Storage Unit 109===

The adapted acoustic model storage unit 109 stores information representing the adapted acoustic model generated by the acoustic model adaptation unit 103. FIG. 7 is a table showing an example of information stored in the adapted acoustic model storage unit 109. Referring to FIG. 7, the adapted acoustic model storage unit 109 stores, as an adapted acoustic model $\Lambda_z$, a pair of a state number i and a Gaussian number j, a static average $\mu_{zij}$, a first-order dynamic average $\Delta\mu_{zij}$, a second-order dynamic average $\Delta\mu_{zij}$, a static variance $\Sigma_{zij}$, a first-order dynamic variance $\Delta\Sigma_{zij}$ and a second-order dynamic variance $\Delta\Delta\Sigma_{zij}$, in a manner to relate them to each other.

The search unit 104 compares the distance between the feature of the noise-suppressed signal outputted by the noise suppression unit 102 and a probability density function for each phoneme included in the adapted acoustic model stored in the adapted acoustic model storage unit 109, and searches for a word sequence corresponding to the input signal.

The speech recognition device 100 according to the first modified example of the first exemplary embodiment has the same effect as that of the speech recognition device 100 according to the first exemplary embodiment.

Second Exemplary Embodiment

Figure 8:
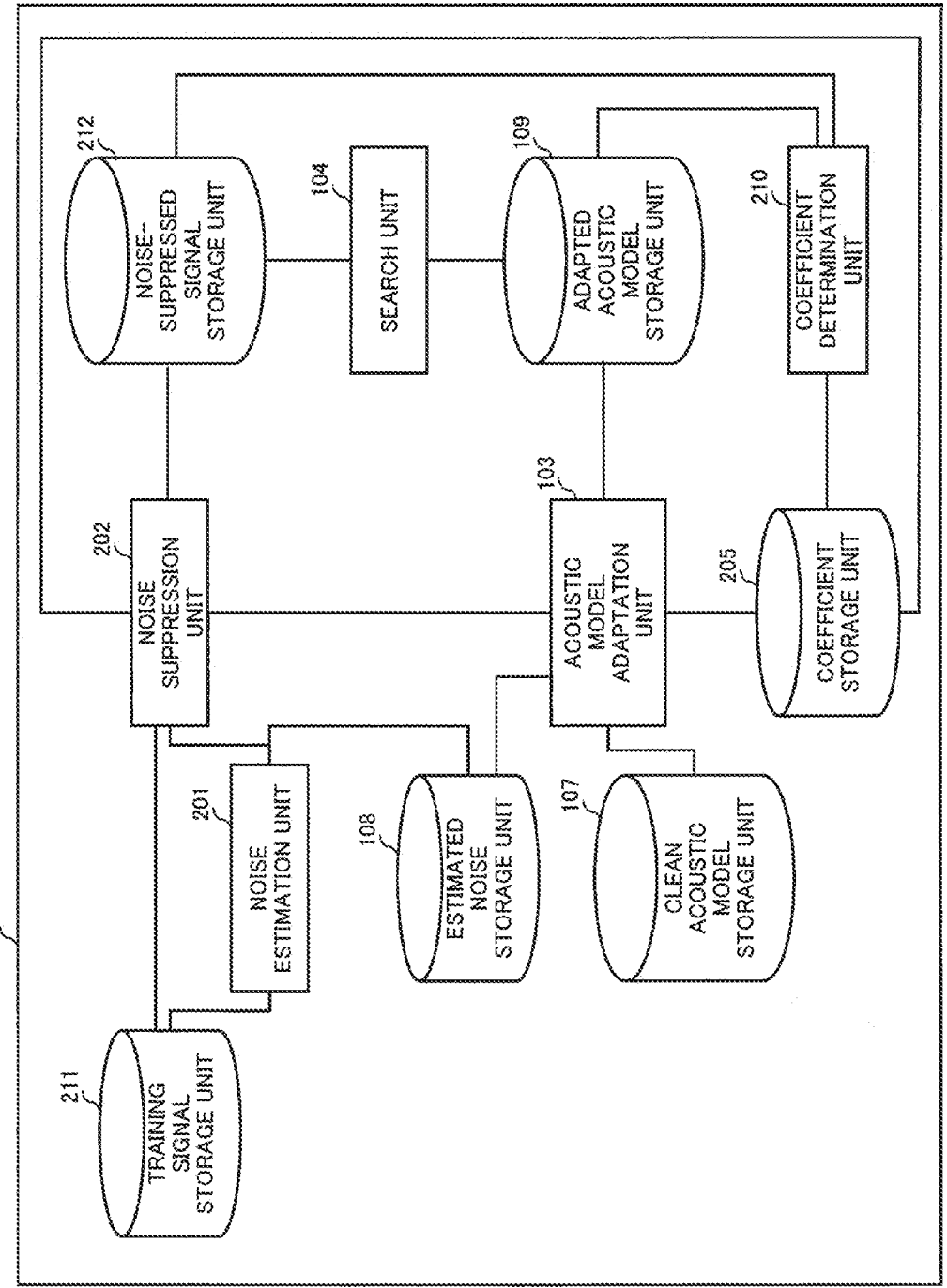
FIG. 8 is a block diagram showing a configuration of a speech recognition device according to a second exemplary embodiment.

FIG. 8 is a block diagram showing a configuration of a speech recognition device 200 according to a second exemplary embodiment of the present invention. Referring to FIG. 8, the speech recognition device 200 includes a coefficient storage unit 205, a noise estimation unit 201, a noise suppression unit 202, the acoustic model adaptation unit 103, the search unit 104, the clean acoustic model storage unit 107, the estimated noise storage unit 108, the adapted acoustic model storage unit 109, a coefficient determination unit 210, a training signal storage unit 211 and a noise-suppressed signal storage unit 212.

In the speech recognition device 200 according to the second exemplary embodiment, the coefficient determination unit 210 determines the suppression coefficient α and the adaptation coefficient β on the basis of training data.

===Training Signal Storage Unit 211===

The training signal storage unit 211 stores training data which is used for determining the suppression coefficient and the adaptation coefficient. FIG. 9 is a table showing an example of information stored in the training signal storage unit 211. Referring to FIG. 9, the training signal storage unit 211 stores time information and the time domain data of the training signal at the time represented by the time information, in a manner to relate them to each other. It is desirable that the training data includes at least the information of the same noise as the noise which is predicted in actual operation of the speech recognition device 200. Then, it is desirable that the training data includes at least data on a several number of utterances.

===Noise-Suppressed Signal Storage Unit 212===

The noise-suppressed signal storage unit 212 stores a feature of the noise-suppressed signal which is extracted by the noise suppression unit 202 on the basis of the noise-suppressed signal obtained by suppressing noise from the input signal. FIG. 10 is a table showing an example of information stored in the noise-suppressed signal storage unit 212. Referring to FIG. 10, the noise-suppressed signal storage unit 212 stores time information and a feature of the noise-suppressed signal at the time represented by the time information, in a manner to relate them to each other.

===Coefficient Storage Unit 205===

The coefficient storage unit 205 stores the suppression coefficient and the adaptation coefficient, in a manner to relate them to each other. And, the coefficient storage unit 205 receives the suppression coefficient and the adaptation coefficient from the coefficient determination unit 210, which will be described later, and updates stored information with the received information.

===Noise Estimation Unit 201===

The noise estimation unit 201 estimates noise from the data of the training signal stored in the training signal storage unit 211, using the same method as that of the noise estimation unit 101 according to the first exemplary embodiment.

===Noise Suppression Unit 202===

The noise suppression unit 202 suppresses noise of the suppression amount specified on the basis of the suppression coefficient stored in the coefficient storage unit 205 from the training data stored in the training signal storage unit 211. Then, the noise suppression unit 202 extracts the feature of the noise-suppressed signal on the basis of the noise-suppressed signal which is a suppressed signal. The noise suppression unit 202 stores the extracted feature of the noise-suppressed signal into the noise-suppressed signal storage unit 212.

===Coefficient Determination Unit 210===

The coefficient determination unit 210 compares the feature of the noise-suppressed signal stored in the noise-suppressed signal storage unit 212 with a training adaptation model stored in the adapted acoustic model storage unit 109. Then, the coefficient determination unit 210 updates the suppression coefficient and the adaptation coefficient on the basis of the comparison result. Specifically, when the differences between the suppression coefficient and the adaptation coefficient which are updated last, and the suppression coefficient and the adaptation coefficient which are updated before last are not both equal to or smaller than a predetermined threshold value, the coefficient determination unit 210 updates the suppression coefficient and the adaptation coefficient.

Figure 11:
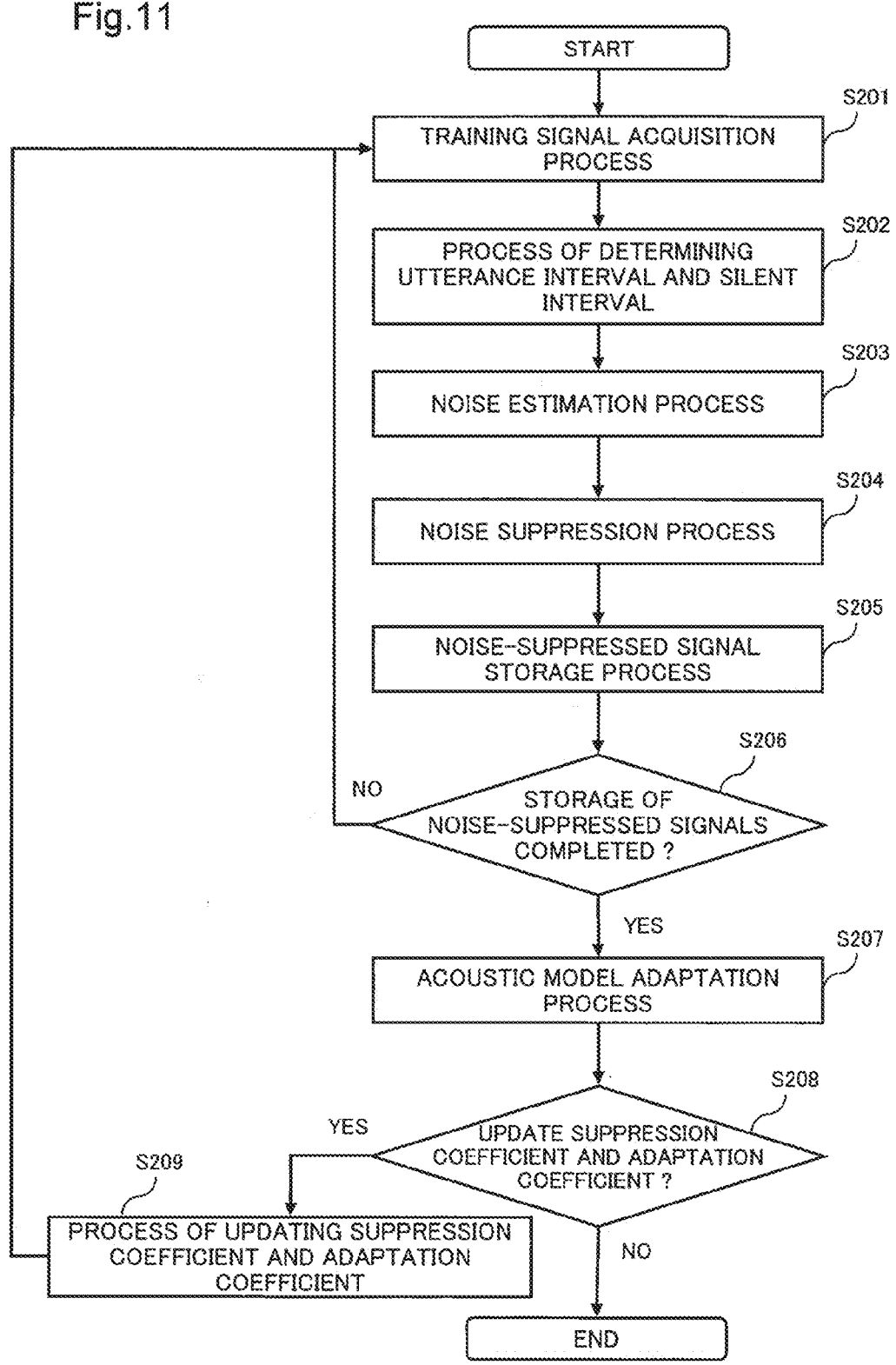
FIG. 11 is a flow chart illustrating an outline of operation of updating a suppression coefficient and an adaptation coefficient by a coefficient determination unit of the speech recognition device according to the second exemplary embodiment.

FIG. 11 is a flow chart illustrating an outline of operation of updating the suppression coefficient and the adaptation coefficient performed by the coefficient determination unit 210 of the speech recognition device 200 according to the second exemplary embodiment of the present invention.

The noise estimation unit 201 reads out the training data stored in the training signal storage unit 211 (step S201).

The noise estimation unit 201 determines a voice interval and a silent interval similarly to in the step S102 according to the first exemplary embodiment from the received input signal, respectively (step S202).

Then, the noise estimation unit 201 estimates noise on the basis of the same method as that of the noise estimation unit 101 according to the first exemplary embodiment from the training signal data stored in the training signal storage unit 211 (step S203).

The noise suppression unit 202 suppresses noise of a suppression amount specified on the basis of the suppression coefficient stored in the coefficient storage unit 205 from the training data stored in the training signal storage unit 211. Then, the noise suppression unit 202 extracts a feature of the noise-suppressed signal from the noise-suppressed signal which is the suppressed signal (step S204).

The noise suppression unit 202 stores the extracted feature of the noise-suppressed signal into the noise-suppressed signal storage unit 212 (step S205).

The noise suppression unit 202 determines whether the storing of features of noise-suppressed signals is completed or not (step S206). For example, the noise suppression unit 202 may determine whether or not storing of features of noise-suppressed signals is completed on the basis of whether or not all training signals stored in the training signal storage unit 211 is stored into the noise-suppressed signal storage unit 212 as features of noise suppressed signals.

When the noise suppression unit 202 determines that the storing of features of noise-suppressed signals is completed ("Yes" at the step S206), the speech recognition device 200 proceeds to a next step S207. On the other hand, the speech recognition device 200 returns to the step S201 when the noise suppression unit 202 determines that the storing of features of noise-suppressed signals is not completed ("No" at the step S206).

The acoustic model adaptation unit 103 performs the acoustic model adaptation on a clean acoustic model by controlling the amount of adaptation on the basis of the adaptation coefficient stored in the coefficient storage unit 205 (step S207). The acoustic model adaptation unit 103 in the step S207 is the same as that of the acoustic model adaptation unit 103 in the step S105 according to the first exemplary embodiment.

The coefficient determination unit 210 determines whether or not to update the suppression coefficient and the adaptation coefficient stored in the coefficient storage unit 205 (step S208). Specifically, the coefficient determination unit 210 identifies the differences between the values of the suppression coefficient and the adaptation coefficient which are updated last, and the values of the suppression coefficient and the adaptation coefficient which are updated before last. Then, when every one of the identified differences is smaller than a predetermined threshold value, the coefficient determination unit 210 determines that the suppression coefficient and the adaptation coefficient is converged, and thus determines not to update the suppression coefficient and the adaptation coefficient stored in the coefficient storage unit 205. On the other hand, when at least either of the identified differences is equal to or larger than the predetermined threshold value, the coefficient determination unit 210 determines to update the suppression coefficient and the adaptation coefficient stored in the coefficient storage unit 205.

In addition, there is no restriction on a configuration for storing the values of the suppression coefficient and the adaptation coefficient which are updated last, and the values of the suppression coefficient and the adaptation coefficient which are updated before last.

For example, the coefficient determination unit 210 may store the values of the suppression coefficient and the adaptation coefficient which are updated last, and the values of the suppression coefficient and the adaptation coefficient which are updated before last, respectively.

Alternatively, the coefficient storage unit 205 may store the values of the suppression coefficient and the adaptation coefficient which are updated last, and the values of the suppression coefficient and the adaptation coefficient which are updated before last, respectively. In this case, the coefficient determination unit 210 reads out the values of the suppression coefficient and the adaptation coefficient which are updated last, and the values of the suppression coefficient and the adaptation coefficient which are updated before last from the coefficient storage unit 205, respectively.

When the coefficient determination unit 210 determines not to update the suppression coefficient and adaptation coefficient stored in the coefficient storage unit 205 ("No" at the step S208), the speech recognition device 200 ends the operation. On the other hand, when the coefficient determination unit 210 determines to update the suppression coefficient and adaptation coefficient stored in the coefficient storage unit 205 ("Yes" at the step S208), the speech recognition device 200 proceeds to a next step S209.

The coefficient determination unit 210 respectively updates the suppression coefficient and adaptation coefficient to improve the speech recognition rate on the basis of a distribution produced by the features of noise-suppressed signals stored in the noise-suppressed signal storage unit 212 and the adapted acoustic model stored in the adapted acoustic model storage unit 109 (step S209).

Specifically, the coefficient determination unit 210 generates a Q function which is a function specified on the basis of the above-described noise-suppressed signals and the adapted acoustic model. The coefficient determination unit 210 calculates the suppression coefficient and the adaptation coefficient for the update using the suppression coefficient and the adaptation coefficient which maximize the Q function.

A specific formula of the Q function is shown in a following equation 18.

$$Q(\alpha, \beta) = \sum_t \sum_{i,j} [\gamma(i, j, t)\log \{p((z_t(\alpha)\Delta z_t(\alpha)\Delta\Delta z_t(\alpha))^T | \Lambda_z(\beta), i, j)\}] \qquad [\text{Equation 18}]$$

In the equation 18, $z_t(\alpha)$ is the equivalence as z in the equation 9. The $z_t(\alpha)$ is a variable corresponding to z in the equation 9 with the suppression coefficient α and a variable t representing a time explicitly described. The $\Delta z_t(\alpha)$ is a first-order dynamic feature derived on the basis of $z_t(\alpha)$. And, the $\Delta\Delta z_t(\alpha)$ is a second-order dynamic feature derived on the basis of $z_t(\alpha)$. The $\Lambda_z(\beta)$ is the equivalence as $\Lambda_z$ in the equation 1. The $\Lambda_z(\beta)$ is also a variable corresponding to $\Lambda_z$ in the equation 1 with the adaptation coefficient β explicitly described. The i is the state number of an HMM. And, the j is the Gaussian number.

In the equation 18, the term shown by an equation 19 is a normal distribution.

$$p((z_t(\alpha)\Delta z_t(\alpha)\Delta\Delta z_t(\alpha))^T | \Lambda_z(\beta), i, j) \qquad [\text{Equation 19}]$$

The γ(i,j,t) is a posterior probability for i and j. That is, a following equation 20 is derived for γ.

$$\gamma(i,j,t) = p(i,j | (\alpha')\Delta z_t(\alpha')\Delta\Delta z_t(\alpha'))^T, \Lambda_z(\beta')) \qquad [\text{Equation 20}]$$

In the equation 20, α' is the suppression coefficient before update. The β' is the adaptation coefficient before update.

If an average, a variance and a random variable are represented by μ, Σ and x, respectively and a normal distribution is expressed by N(x; μ, Σ), the equation 18 is expressed also as an equation 21.

$$Q(\alpha, \beta) = \quad [\text{Equation 21}]$$

$$\sum_t \sum_{i,j} \gamma(i, j, t) \log \left\{ N \left( \begin{pmatrix} z_t(\alpha) \\ \Delta z_t(\alpha) \\ \Delta\Delta z_t(\alpha) \end{pmatrix}; \begin{pmatrix} \mu_{zij}(\beta) \\ \Delta\mu_{zij}(\beta) \\ \Delta\Delta\mu_{zij}(\beta) \end{pmatrix}, \right. \right.$$

$$\left. \left. \begin{pmatrix} \Sigma_{zij}(\beta) & 0 & 0 \\ 0 & \Delta\Sigma_{zij}(\beta) & 0 \\ 0 & 0 & \Delta\Delta\Sigma_{zij}(\beta) \end{pmatrix} \right) \right\}$$

A specific method for deriving the suppression coefficient $\alpha$ and the adaptation coefficient $\beta$ for maximizing the Q function shown in the equation 21 will be described below. The suppression coefficient $\alpha$ and the adaptation coefficient $\beta$ for maximizing the Q function are derived by applying a numerical analysis such as a Newton method.

For reducing the amount of calculation, for example, an example of calculating the suppression coefficient $\alpha$ and the adaptation coefficient $\beta$ on the basis of a closed-form equation is shown in the present specification. As the Q function of this case, a Q function, in which one parameter among the three average parameters ($\mu_{zij}$, $\Delta\mu_{zij}$ and $\Delta\Delta\mu_{zij}$) included in the adapted acoustic model depends on the adaptation coefficient $\beta$, may be employed.

For example, when the static average ($\mu_{zij}$) depends on the adaptation coefficient $\beta$ and the other parameters depend on the adaptation coefficient $\beta'$ before update, the Q function is given by a following equation 22.

$$Q(\alpha, \beta) = \sum_t \sum_{i,j} \gamma(i, j, t) \log\{N(z_t(\alpha); \mu_{zij}(\beta), \Sigma_{zij}(\beta'))\} \quad [\text{Equation 22}]$$

When the suppression coefficient $\alpha$ and the adaptation coefficient $\beta$ are scalar and the relationship between them is given by an equation $\alpha + \beta = 1$, the equation 22 is expressed as a following equation 23.

$$\alpha = \frac{\sum_{t,i,j}[\gamma(t,i,j)(y'^T_{tij}\Sigma_{zij}(\beta')^{-1}g'_{tij} + g'^T_{tij}\Sigma_{zij}(\beta')^{-1}y'_{tij})]}{\sum_{t,i,j}[2\gamma(t,i,j)(g'^T_{tij}\Sigma_{zij}(\beta')^{-1}g'_{tij})]} \quad [\text{Equation 23}]$$

$$\beta = 1 - \frac{\sum_{t,i,j}[\gamma(t,i,j)(y'^T_{tij}\Sigma_{zij}(\beta')^{-1}g'_{tij} + g'^T_{tij}\Sigma_{zij}(\beta')^{-1}y'_{tij})]}{\sum_{t,i,j}[2\gamma(t,i,j)(g'^T_{tij}\Sigma_{zij}(\beta')^{-1}g'_{tij})]}$$

Alternatively, when the suppression coefficient $\alpha$ and the adaptation coefficient $\beta$ are diagonal matrices and the relationship between them is given by an equation $\alpha+\beta=I$ (here, I is a unit matrix), the equation 22 is expressed by a following equation 24.

$$\mathrm{diag}(\alpha) = \left[\sum_{t,i,j}\gamma(t,i,j)G'_{tij}(\Sigma^{-1}_{zij}(\beta') + \Sigma^{-1}_{zij}(\beta')^T)G'_{tij}\right]^{-1} \quad [\text{Equation 24}]$$

$$\left[\sum_{t,i,j}\gamma(t,i,j)G'_{tij}(\Sigma^{-1}_{zij}(\beta') + \Sigma^{-1}_{zij}(\beta')^T)(y'_{ij})\right]$$

$$\beta = I - \alpha$$

In the equations 23 and 24, a relationship expressed by an equation 25 is derived.

$$y'_{tij} = (y_t - g(\mu_{xij}, \mu_n) - \mu_{xij})$$

$$g'_{tij} = (g(d'_t, n'_t) - g(\mu_{xij}, \mu_n)) \quad [\text{Equation 25}]$$

In the equation 24, $G'_{tij}$ is a diagonal matrix which satisfies a relationship expressed by an equation 26.

$$\mathrm{diag}(G'_{tij}) = g'_{tij} \quad [\text{Equation 26}]$$

In the equation 26, diag(*) is an operator to vectorize diagonal components of a square matrix.

When the suppression coefficient $\alpha$ and the adaptation coefficient $\beta$ are general square matrices, the equation 24 is expressed also as a following equation 27.

$$\mathrm{vec}(\alpha) = \left(\sum_{i,j} Y_{ij} \otimes X_{ij}\right)^{-1} \mathrm{vec}(C) \quad [\text{Equation 27}]$$

$$\beta = I - \alpha$$

In the equation 27, vec(*) is an operator to vectorize a matrix. And, the operator shown by a following equation 28 is an operator expressing a Kronecker product.

$$\otimes \quad [\text{Equation 28}]$$

In the equation 27, a relationship expressed by a following equation 29 is derived.

$$Y_{tij} = \gamma(t,i,j)g_{tij}g^T_{tij} \quad [\text{equation 29}]$$

$$X_{tij} = \gamma(t,i,j)(\Sigma^{-1}_{zij}(\beta') + \Sigma^{-1}_{zij}(\beta')^T)$$

$$C = \sum_{t,i,j}\gamma(t,i,j)(\Sigma^{-1}_{zij}(\beta') + \Sigma^{-1}_{zij}(\beta'))y'_{tij}g^T_{tij}$$

After the step S209, the speech recognition device 200 returns to the step S201.

The speech recognition device 200 according to the second exemplary embodiment calculates the suppression coefficient $\alpha$ and the adaptation coefficient $\beta$ which maximize the Q function on the basis of the training data. Because the speech recognition device 200 includes a means capable of determining the suppression coefficient and the adaptation coefficient which enable realization of high recognition accuracy on the basis of the calculation, it can realize a higher speech recognition rate.

Third Exemplary Embodiment

Figure 12:
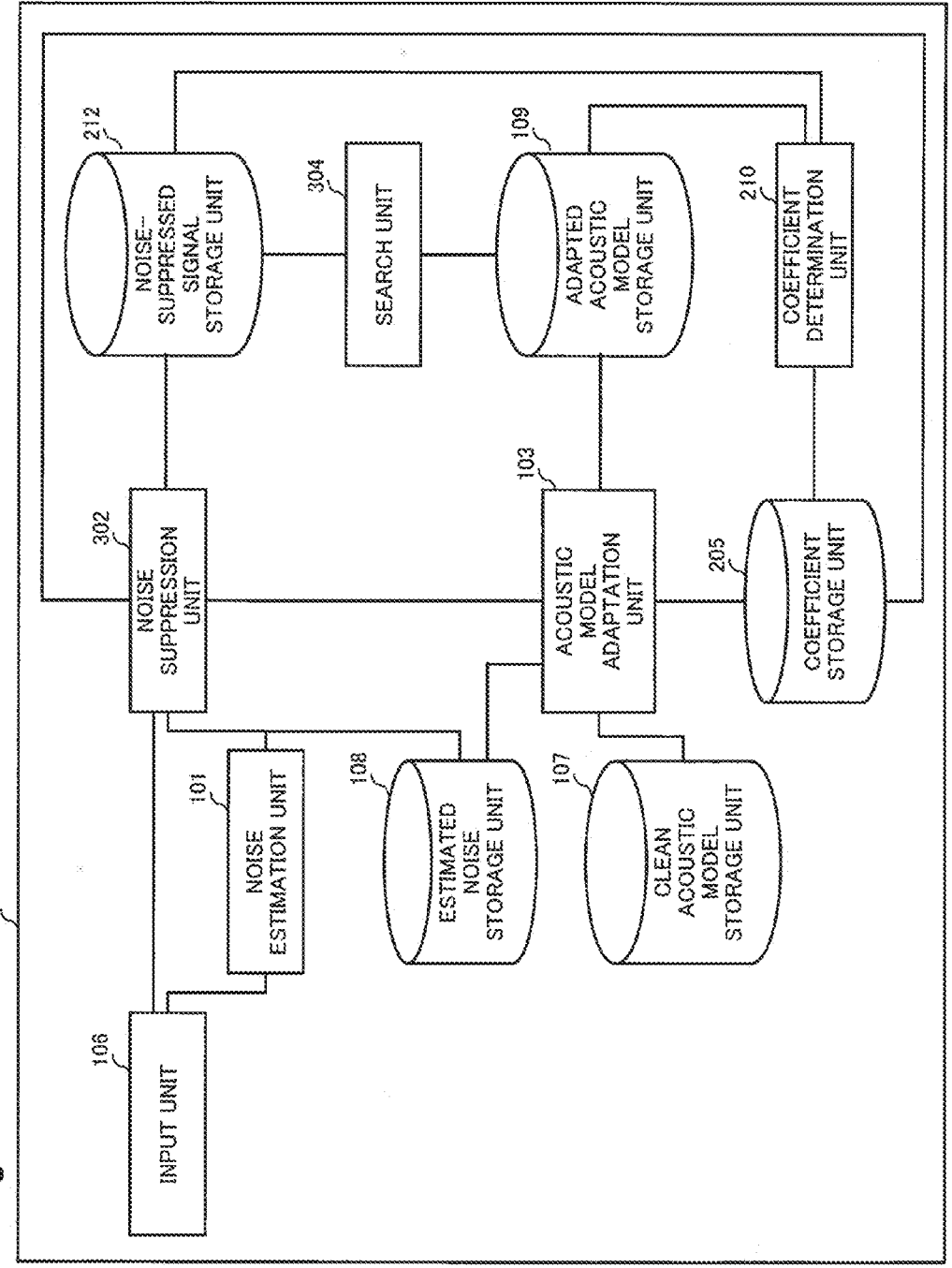
FIG. 12 is a block diagram showing an example of a configuration of a speech recognition device according to a third exemplary embodiment.

FIG. 12 is a block diagram showing an example of a configuration of a speech recognition device 300 according to a third exemplary embodiment of the present invention. Referring to FIG. 12, the speech recognition device 300 includes the coefficient storage unit 205, the noise estimation unit 101, a noise suppression unit 302, the acoustic model adaptation unit 103, a search unit 304, the input unit 106, the clean acoustic model storage unit 107, the estimated noise storage unit 108, the adapted acoustic model storage unit 109, the coefficient determination unit 210 and the noise-suppressed signal storage unit 212.

The speech recognition device 300 according to the third exemplary embodiment updates the suppression coefficient and the adaptation coefficient on the basis of a distribution of the noise-suppressed suppressed in accordance with the suppression coefficient of the estimated noise estimated from the input signal, and an adapted acoustic model which is adapted on the basis of the adaptation coefficient. Accordingly, the speech recognition device 300 can appropriately update the suppression coefficient and the adaptation coefficient on the basis of the input signal. That is, the speech recognition device 300 can perform noise suppression and noise adaptation using an optimum suppression coefficient and an optimum adaptation coefficient in terms of each input signal, for example, in terms of each utterance.

===Noise Suppression Unit 302===

The noise suppression unit 302 receives the input signal from the input unit 106. Then, the noise suppression unit 302 suppresses noise of the suppression amount specified on the basis of the suppression coefficient stored in the coefficient storage unit 105 from the received input signal. The noise suppression unit 302 extracts the feature of the noise-suppressed signal from the noise-suppressed signal which is a suppressed signal. Then, the noise suppression unit 302 stores the extracted feature of the noise-suppressed signal into the noise-suppressed signal storage unit 212. Other functions which the noise suppression unit 302 includes may be the same as functions that the noise suppression unit 102 according to the first exemplary embodiment includes.

===Search Unit 304===

The search unit 304 compares the distance between the feature of the noise-suppressed signal stored in the noise-suppressed signal storage unit 212 and the probability density function for each phoneme included in the adapted acoustic model stored in the adapted acoustic model storage unit 109, and searches for a word sequence corresponding to the input signal. Other functions which the search unit 304 includes may be the same as functions that the search unit 104 according to the first exemplary embodiment includes.

Figure 13:
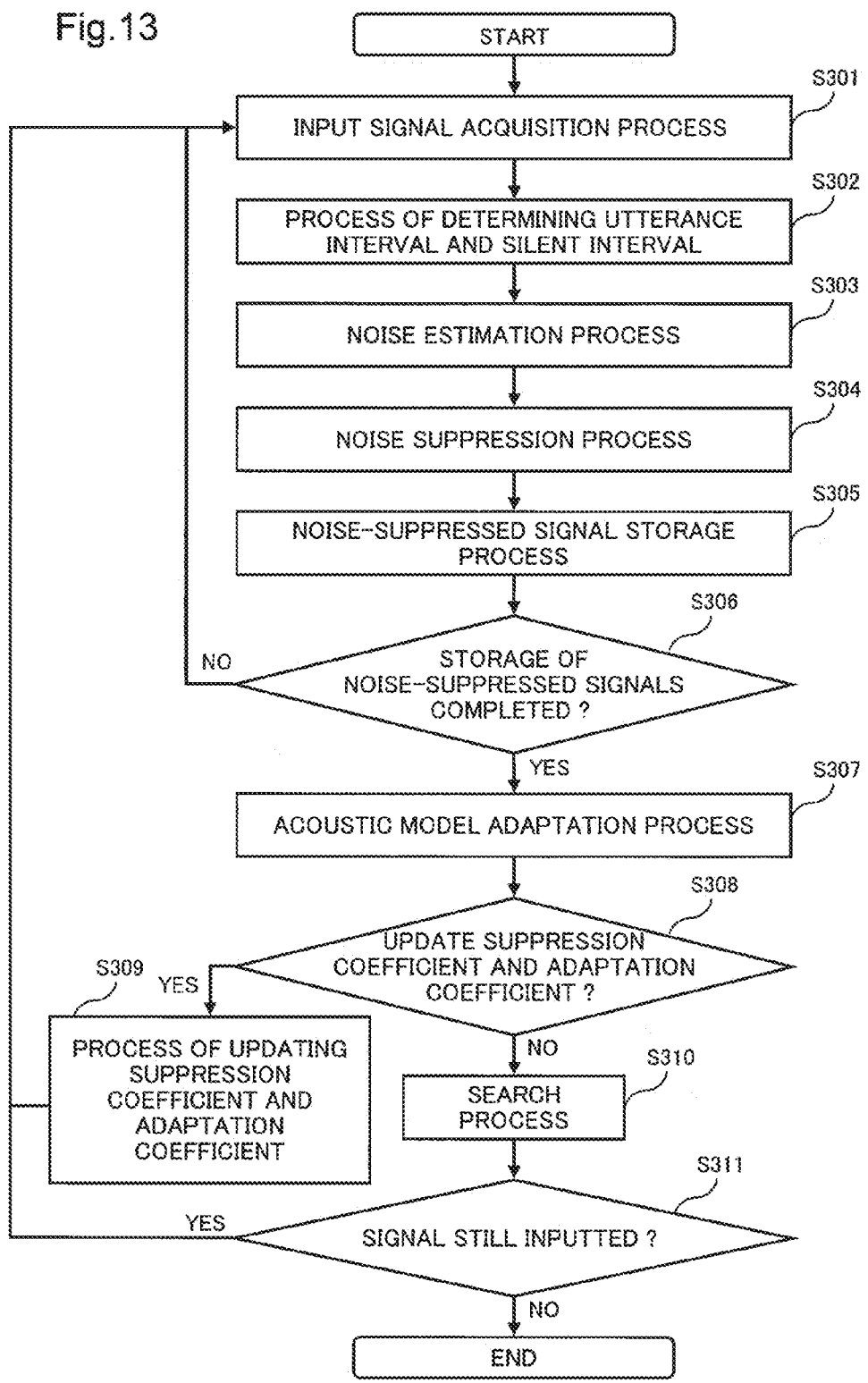
FIG. 13 is a flow chart illustrating an outline of operation of the speech recognition device according to the third exemplary embodiment.

FIG. 13 is a flow chart illustrating an outline of operation of the speech recognition device 300 according to the third exemplary embodiment of the present invention.

The input unit 106 receives the input signal and cuts out the input signal successively according to the time series. Then, the input unit 106 performs short-term discrete Fourier transform on the cut-out data. Then, the input unit 106 transforms the transformed data into a power spectrum (step S301). The input unit 106 transfers the transformed power spectrum to the noise estimation unit 101.

The noise estimation unit 101 receives the input signal from the input unit 106. Next, the noise estimation unit 101 respectively determines a voice interval and a silent interval on the basis of voice detection from the received input signal (step S302). The process performed by the noise estimation unit 101 in the step S302 is the same as that in the step S102 by the noise estimation unit 101 according to the first exemplary embodiment.

The noise estimation unit 101 estimates a noise component from the received input signal (step S303). The process performed by the noise estimation unit 101 in the step S303 is the same as that in the step S103 by the noise estimation unit 101 according to the first exemplary embodiment. The noise estimation unit 101 extracts the feature of the estimated noise from the estimated noise, and stores the feature of the estimated noise into the estimated noise storage unit 108.

The noise suppression unit 302 suppresses noise from the input signal on the basis of the input signal, the estimated noise estimated by the noise estimation unit 101 and the suppression coefficient stored in the coefficient storage unit 105, and generates the noise-suppressed signal. Then, the noise suppression unit 302 extracts the feature of the noise-suppressed signal from the noise-suppressed signal generated (step S304). The process performed by the noise suppression unit 302 in the step S304 is the same as that in the step S106 by the noise suppression unit 102 according to the first exemplary embodiment. The noise suppression unit 302 may read out the feature of the estimated noise extracted by the noise estimation unit 101 from the estimated noise storage unit 108.

The noise suppression unit 302 stores the extracted feature of the noise-suppressed signal into the noise-suppressed signal storage unit 212 (step S305). The process performed by the noise suppression unit 302 in the step S305 is the same as that in the step S205 by the noise suppression unit 202 according to the second exemplary embodiment.

The noise suppression unit 302 determines whether storing of features of noise-suppressed signals is completed or not (step S306). The process performed by the noise suppression unit 302 in the step S306 is the same as that in the step S206 by the noise suppression unit 202 according to the second exemplary embodiment.

When the noise suppression unit 202 determines that the storing of features of noise-suppressed signals is completed ("Yes" at the step S306), the speech recognition device 300 proceeds to a next step S307. On the other hand, when the noise suppression unit 202 determines that the storing of features of noise-suppressed signals is not completed ("No" at the step S306), the speech recognition device 300 returns to the step S301.

The acoustic model adaptation unit 103 adapts the acoustic model on the clean acoustic model stored in advance in the clean acoustic model storage unit 107 by controlling the amount of adaptation on the basis of the adaptation coefficient stored in the coefficient storage unit 205 (step S307). The process performed by the acoustic model adaptation unit 103 in the step S307 is the same as that in the step S105 by the acoustic model adaptation unit 103 according to the first exemplary embodiment.

The coefficient determination unit 210 determines whether or not to update the suppression coefficient and the adaptation coefficient stored in the coefficient storage unit 205 (step S308). Specifically, the coefficient determination unit 210 identifies the differences between the values of the suppression coefficient and the adaptation coefficient which are updated last, and the values of the suppression coefficient and the adaptation coefficient which are updated before last. Then, when every one of the identified differences is smaller than a predetermined threshold value, the coefficient determination unit 210 determines that the suppression coefficient and the adaptation coefficient is converged, and determines not to update the suppression coefficient and the adaptation coefficient stored in the coefficient storage unit 205. On the other hand, when at least either of the identified differences is equal to or larger than the predetermined threshold value, the coefficient determination unit 210 determines to update the suppression coefficient and the adaptation coefficient stored in the coefficient storage unit 205.

When the coefficient determination unit 210 determines to update the suppression coefficient and the adaptation coefficient stored in the coefficient storage unit 205 ("Yes" at the step S308), it performs a following process. That is, the coefficient determination unit 210 respectively updates the suppression coefficient and the adaptation coefficient with the suppression coefficient and the adaptation coefficient which improve the speech recognition rate on the basis of the distribution produced by the features of noise-suppressed signals stored in the noise-suppressed signal storage unit 212 and the adapted acoustic model stored in the adapted acoustic model storage unit 109 (step S309). The process by the coefficient determination unit 210 in the step S309 is the same as that in the step S209 by the coefficient determination unit 210 according to the second exemplary embodiment. After the step S309, the speech recognition device 300 returns to the step S301.

On the other hand, when the coefficient determination unit 210 determines not to update the suppression coefficient and the adaptation coefficient stored in the coefficient storage unit 205 ("No" at the step S308), the search unit 304 performs a following process. That is, the search unit 304 compares the distance between the feature of the noise-suppressed signal stored in the noise-suppressed signal storage unit 212 and the probability density function for each phoneme included in the adapted acoustic model stored in the adapted acoustic model storage unit 109, and searches for a word sequence corresponding to the input signal (step S310). The process performed by the search unit 304 in the step S310 is the same as that in the step S107 by the search unit 104 according to the first exemplary embodiment.

The noise estimation unit 101 determines whether a signal is still inputted or not (step S311). For example, the noise estimation unit 101 may determine whether a signal is still inputted or not on the basis of whether or not the silent interval detected in the step S302 is continued for a predetermined time period.

When the noise estimation unit 101 determines that a signal is not inputted ("No" at the step S311), the speech recognition device 300 ends the operation. On the other hand, when the noise estimation unit 101 determines that a signal is still inputted ("Yes" at the step S311), the speech recognition device 300 returns to the step S301. The process performed by the noise estimation unit 101 in the step S311 is the same as that in the step S107 by the noise estimation unit 101 according to the first exemplary embodiment.

The speech recognition device 300 according to the third exemplary embodiment updates the suppression coefficient and the adaptation coefficient on the basis of the distribution of noise-suppressed signal suppressed in accordance with the suppression coefficient estimated from the input signal, and an adapted acoustic model which is adapted on the basis of the adaptation coefficient. Accordingly, the speech recognition device 300 can appropriately update the suppression coefficient and the adaptation coefficient on the basis of an input signal. That is, the speech recognition device 300 can perform noise suppression and noise adaptation using an optimum suppression coefficient and an optimum adaptation coefficient in terms of each input signal, for example, in terms of each utterance.

Fourth Exemplary Embodiment

Figure 14:
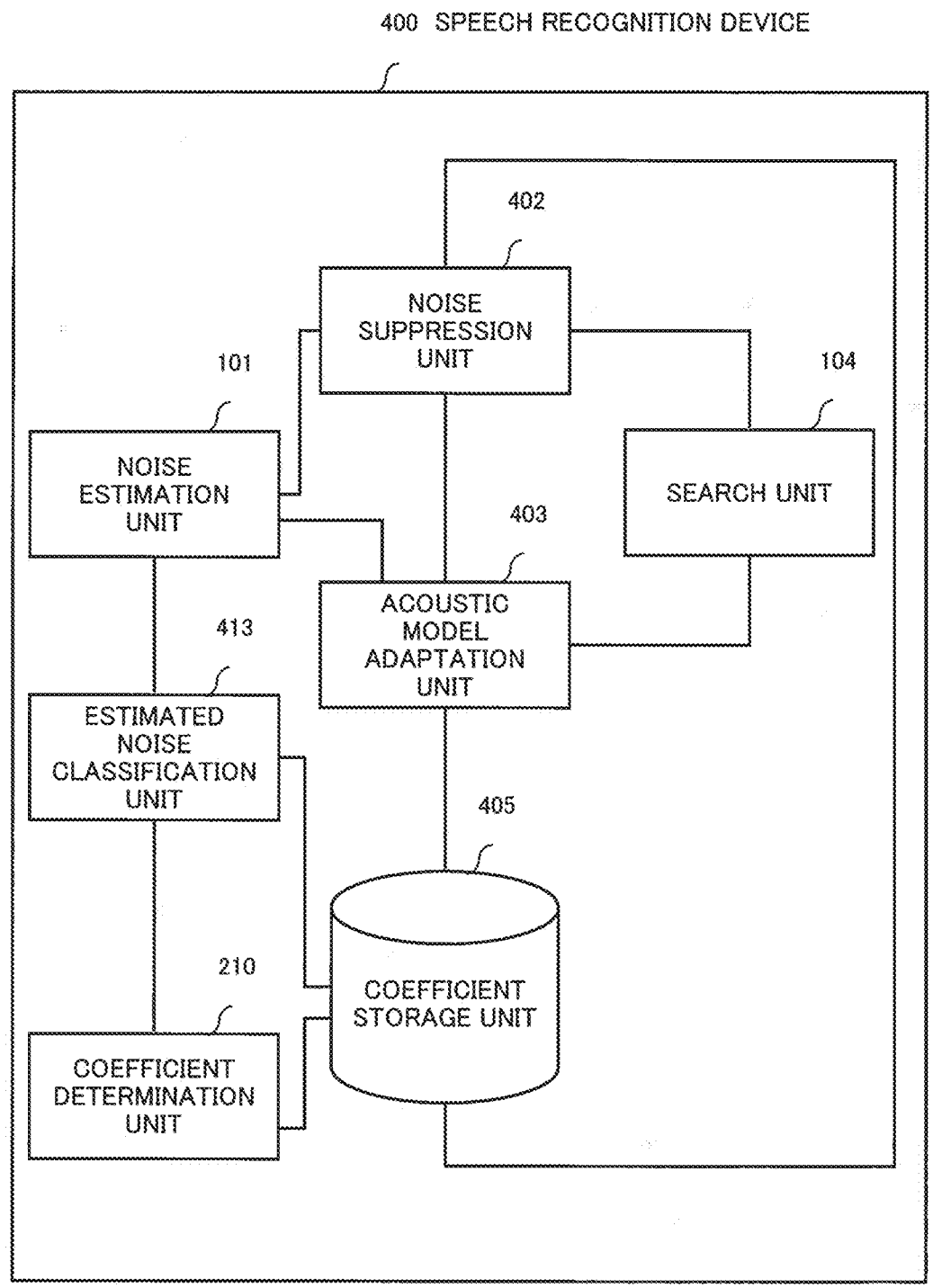
FIG. 14 is a block diagram showing a configuration of a speech recognition device according to a fourth exemplary embodiment.

FIG. 14 is a block diagram showing a configuration of a speech recognition device 400 according to a fourth exemplary embodiment of the present invention. Referring to FIG. 14, the speech recognition device 400 includes a coefficient storage unit 405, the noise estimation unit 101, a noise suppression unit 402, an acoustic model adaptation unit 403, the search unit 104, the coefficient determination unit 210 and an estimated noise classification unit 413.

===Coefficient Storage Unit 405===

The coefficient storage unit 405 stores a suppression coefficient, an adaptation coefficient and a noise identifier enabling identification of a class to which a noise belongs, in a manner to relate them to each other. The suppression coefficient and the adaptation coefficient may be the same as the suppression coefficient and the adaptation coefficient stored in the coefficient storage unit 105 according to the first exemplary embodiment.

===Estimated Noise Classification Unit 413===

The estimated noise classification unit 413 calculates a predetermined statistic value on the basis of the estimated noise estimated by the noise estimation unit 101. The predetermined statistic value may be any value calculated from features of the estimated noise for a several number of frames, such as a static average, a static variance, and so on. Then, the estimated noise classification unit 413 specifies a noise class to which the estimated noise belongs on the basis of the calculated statistics value. For example, the estimated noise classification unit 413 may respectively specify a class for each predetermined range of the statistic value. Then, the estimated noise classification unit 413 respectively specifies the suppression coefficient α and the adaptation coefficient β on the basis of the class to which the estimated noise belongs. The estimated noise classification unit 413 stores the specified suppression coefficient α and adaptation coefficient β, and the noise identifier enabling identification of the noise class, in a manner to relate them to each other, into the coefficient storage unit 405.

For example, the speech recognition device 400 calculates in advance a representative value for each of the noise classes. In the present specification, it is supposed that a static variance of features of the estimated noise is employed as a predetermined statistic value. These representative values are calculated from noises belonging to the respective classes, respectively. The speech recognition device 400 calculates respective suppression coefficients α and adaptation coefficients β on the basis of the representative values. Specifically, the speech recognition device 400 may calculate the suppression coefficient α and the adaptation coefficient β for each class by the use of the process of the step S209 performed by the coefficient determination unit 210 according to the second exemplary embodiment.

The estimated noise classification unit 413 calculates a static variance $\Sigma'$ of the estimated noise on the basis of the estimated noise estimated by the noise estimation unit 101. Then, the estimated noise classification unit 413 calculates a value expressed by an equation 30 to a static variance $\Sigma_i$ (i=0, . . . , N; N is the number of classes) corresponding to each class.

$$\|\Sigma' - \Sigma_i\| \qquad \text{[Equation 30]}$$

Then, the estimated noise classification unit 413 specifies a class i corresponding to a static variance $\Sigma_i$ minimizing the value expressed by the equation 30 as the class to which the estimated noise belongs. Then, the estimated noise classification unit 413 stores the suppression coefficient α and the adaptation coefficient β corresponding to the specified class i, and the noise identifier enabling identification of the class i, in a manner to relate them to each other, into the coefficient storage unit 405.

The above description shows just one specific example of operation of the estimated noise classification unit 413, and a statistic to be calculated and its calculation method are not limited to that described above.

The estimated noise classification unit 413 may calculate the suppression coefficient α and the adaptation coefficient β which maximize the speech recognition rate by the use of a noise belonging to each class, respectively. Alternatively, the estimated noise classification unit 413 may transfer the noises belonging to respective classes to the coefficient determination unit 210 according to the second exemplary embodiment, and the coefficient determination unit 210 may calculate an optimum suppression coefficient α and adaptation coefficients β for each class. Then, the coefficient determination unit 210 may store the calculated suppression coefficient α and adaptation coefficient β and the noise identifier enabling identification of the noise class, in a manner to relate them to each other, into the coefficient storage unit 405.

===Noise Suppression Unit 402===

The noise suppression unit 402 suppresses, from the input signal, noise of the suppression amount specified on the basis of the suppression coefficient stored in the coefficient storage unit 405 in a manner to be related to the noise identifier enabling identification of the noise class estimated by the estimated noise classification unit 413. Other functions which the noise suppression unit 402 includes may be the same as functions that the noise suppression unit 102 according to the first exemplary embodiment includes.

===Acoustic Model Adaptation Unit 403===

The acoustic model adaptation unit 403 adapts the acoustic model on the clean acoustic model, by controlling the amount of adaptation in accordance with the adaptation coefficient stored in the coefficient storage unit 405 in a manner to be related to the noise identifier enabling identification of the noise class estimated by the estimated noise classification unit 413. Other functions which the acoustic model adaptation unit 403 includes may be the same as functions that the acoustic model adaptation unit 103 according to the first exemplary embodiment includes.

Figure 15:
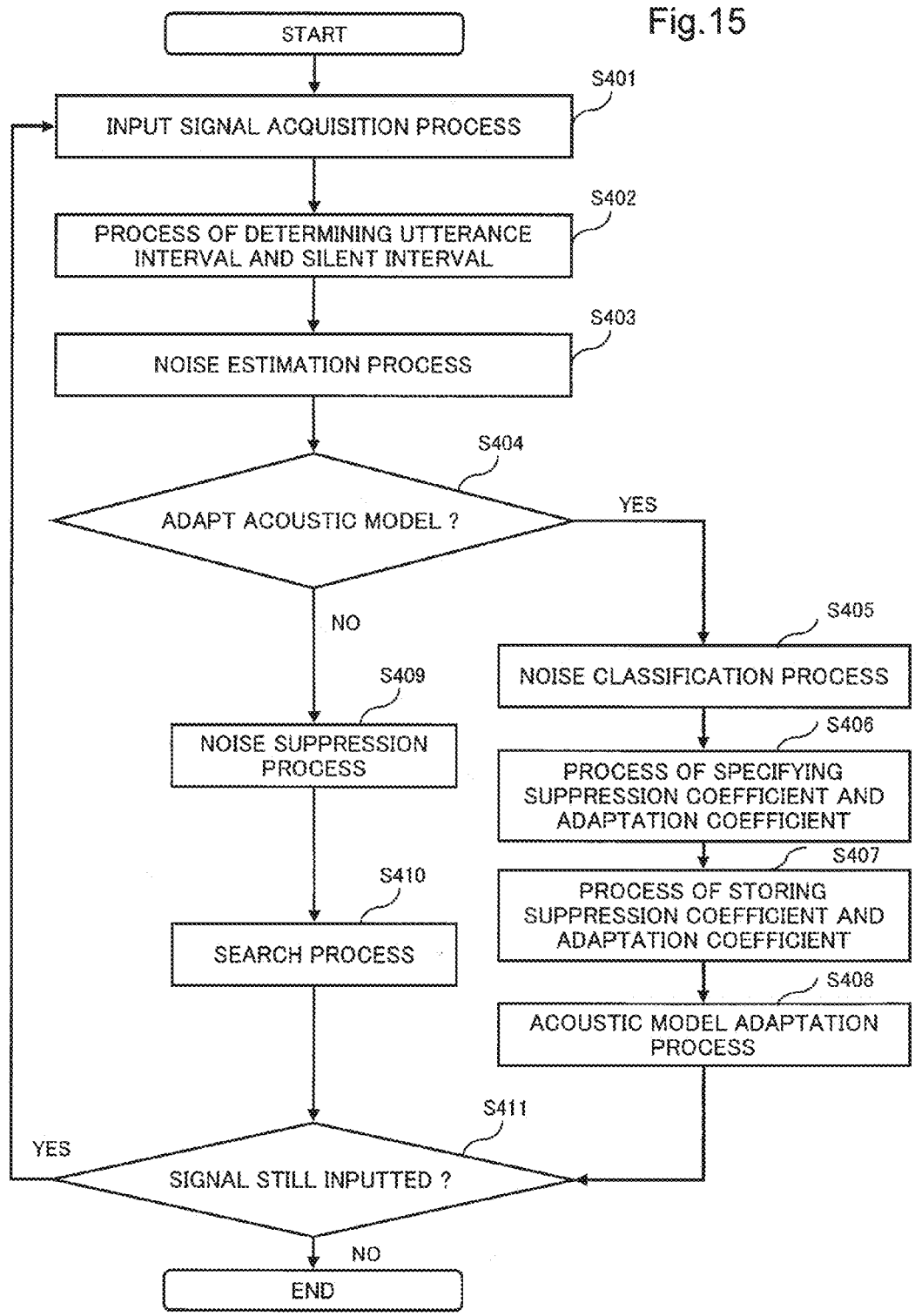
FIG. 15 is a flow chart illustrating an outline of operation of the speech recognition device according to the fourth exemplary embodiment.

FIG. 15 is a flow chart illustrating an outline of operation of the speech recognition device 400 according to the fourth exemplary embodiment of the present invention.

In FIG. 15, the processes in steps S401 to S404 are the same as that in the steps S101 to S104 according to the first exemplary embodiment.

When the acoustic model adaptation unit 403 determines to adapt the acoustic model ("Yes" at the step S404), the speech recognition device 400 proceeds to a step S405.

The estimated noise classification unit 413 specifies the estimated noise which is estimated on the basis of the input signal at a time between the time when the acoustic model adaptation unit 103 adapts the acoustic model last time and the time when the acoustic model adaptation unit 103 adapts the acoustic model this time among estimated noises estimated by the noise estimation unit 101. Then, the estimated noise classification unit 413 specifies the class to which the estimated noise belongs, on the basis of a predetermined statistic value calculated from the estimated noise specified (step S405).

Then, the estimated noise classification unit 413 respectively specifies the suppression coefficient α and the adaptation coefficient β on the basis of the class to which the estimated noise belongs (step S406).

The estimated noise classification unit 413 stores the specified suppression coefficient α and the adaptation coefficient β into the coefficient storage unit 405, relating to the noise identifier enabling identification of the class to which the estimated noise belongs (step S407).

The acoustic model adaptation unit 403 specifies the adaptation coefficient which is stored in the coefficient storage unit 405 in a manner to be related to the noise identifier enabling identification of the noise class estimated by the estimated noise classification unit 413. Then, the acoustic model adaptation unit 403 adapts on the clean acoustic model, by controlling the amount of adaptation on the basis of the specified adaptation coefficient described above (step S408). After the step S408, the speech recognition device 400 proceeds to a step S411.

On the other hand, in the step S404, when the acoustic model adaptation unit 403 determines not to adapt the acoustic model ("No" at the step S404), the noise suppression unit 402 performs a following process.

That is, the noise suppression unit 402 specifies the suppression coefficient which is stored in the coefficient storage unit 405 in a manner to be related to the noise identifier enabling identification of the noise class estimated by the estimated noise classification unit 413. Then, the noise suppression unit 402 suppresses noise from the input signal on the basis of the input signal, the estimated noise estimated by the noise estimation unit 101 and the suppression coefficient specified as described above, and generates the noise-suppressed signal.

Then, the noise suppression unit 402 extracts the feature of the noise-suppressed signal from the generated noise-suppressed signal, and outputs the extracted feature of the noise-suppressed signal (step S409).

In FIG. 15, the processes in the steps S410 and S411 are the same as that in the steps S107 and S108 according to the first exemplary embodiment.

The speech recognition device 400 according to the fourth exemplary embodiment can set an optimum suppression coefficient α and an optimum adaptation coefficient β for each noise type. Therefore, the speech recognition device 400 is robust to a larger variety of noises.

Fifth Exemplary Embodiment

Figure 16:
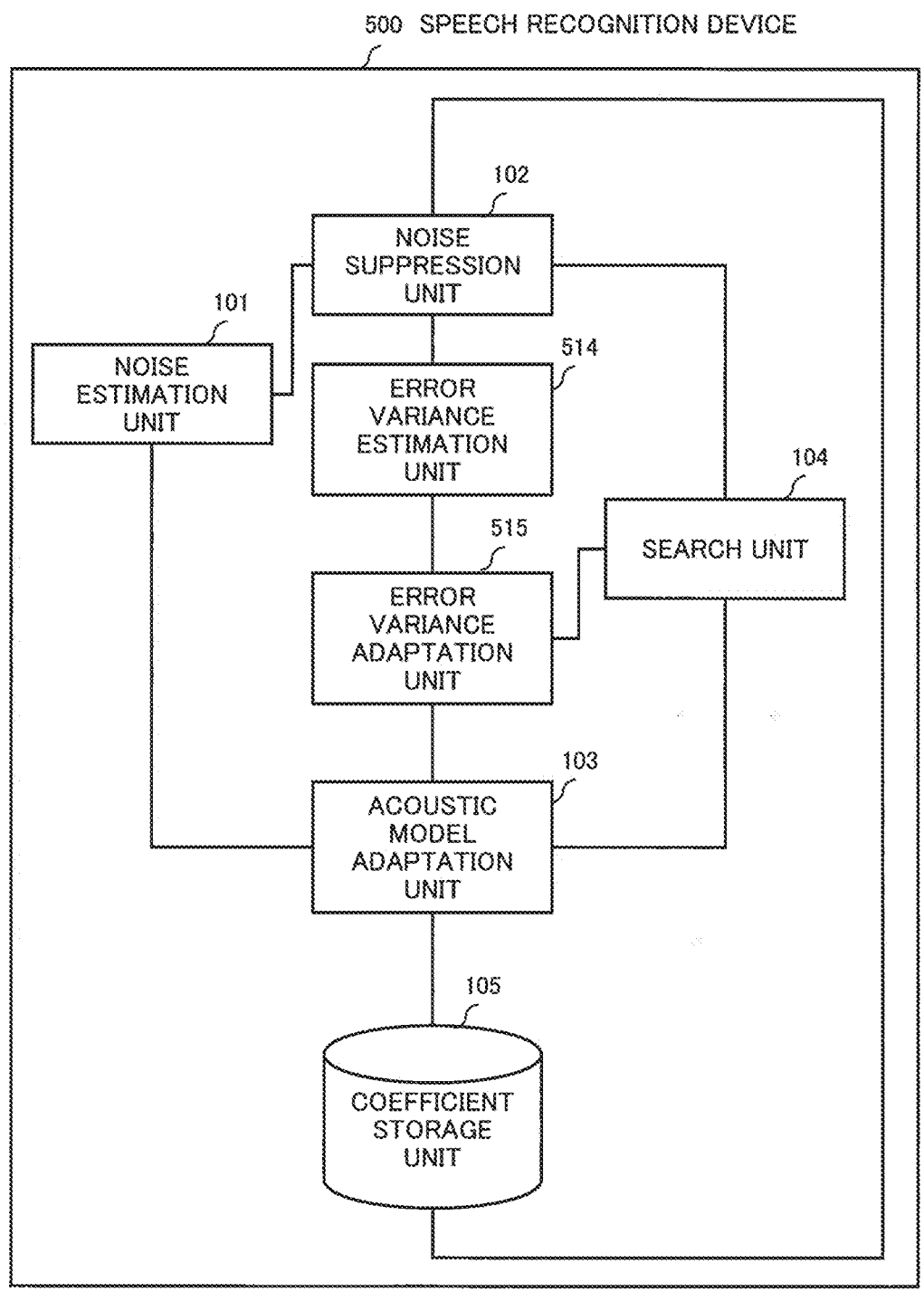
FIG. 16 is a block diagram showing a configuration of a speech recognition device according to a fifth exemplary embodiment.

FIG. 16 is a block diagram showing a configuration of a speech recognition device 500 according to a fifth exemplary embodiment of the present invention. Referring to FIG. 16, the speech recognition device 500 includes the coefficient storage unit 105, the noise estimation unit 101, the noise suppression unit 102, the acoustic model adaptation unit 103, the search unit 104, an error variance estimation unit 514 and an error variance adaptation unit 515.

===Error Variance Estimation Unit 514===

The error variance estimation unit 514 estimates an error variance of amounts of noise suppression in the noise-suppressed signals which are suppressed noise from the input signals on the basis of the suppression coefficient α by the noise suppression unit 102 suppressing.

The above-mentioned error variance of suppression amounts is expressed ideally by a following equation 31.

$$\Sigma_e = E[(x-\hat{x})^2] \quad \text{[Equation 31]}$$

In the equation 31, x is a true feature of the voice. In the equation 31, a variable with a symbol ^(hat) given above the variable x (hereafter, the variable is written also as "x^'") is a feature of noise-suppressed signal in the case of α=1.

However, because the true voice is usually unknown, the error variance estimation unit 514 can not calculate an error variance using the equation represented as the equation 31. There is a method of calculating an error variance of suppression amounts on the basis of an equation represented ad a following equation 32, under supposing that the above-mentioned error variance of suppression amounts is proportional to a variance of the difference between the feature x^ of the noise-suppressed signal and an observed feature y of the input signal.

$$\Sigma_e = \lambda E[(y-\hat{x})^2] \quad \text{[Equation 32]}$$

In the equation 32, λ is a constant of proportionality. This λ may be estimated using an EM algorithm (Expectation-maximization algorithm).

The error variance estimation unit 514 calculates an error variance of suppression amounts by the equation represented as the equation 32.

In addition, the error variance estimation unit 514 may derive in advance the above-mentioned error variance of suppression amounts using the equation 31, using training data enabling specification of the true feature of the voice.

===Error Variance Adaptation Unit 515===

The error variance adaptation unit 515 adapts further model on the adapted acoustic model adapted by the acoustic model adaptation unit 103 on the basis of the error variance of amounts of noise suppression estimated by the error variance estimation unit 514.

Specifically, the error variance adaptation unit 515 adapts further model on the adapted acoustic model on the basis of following equations 33, 34 and 35.

$$\Sigma_{zij}(\beta,\alpha)=(I-\beta G)\Sigma_{zij}(I-\beta G)^T+\beta G\Sigma_n(\beta G)^T+\alpha^2\Sigma_e \quad \text{[Equation 33]}$$

$$\Delta\Sigma_{zij}(\beta,\alpha)=(I-\beta G)\Delta\Sigma_{xij}(I-\beta G)^T+\beta G\Delta\Sigma_n(\beta G)^T\alpha^2\Delta\Sigma^e \quad \text{[Equation 34]}$$

$$\Delta\Delta\Sigma_{zij}(\beta,\alpha)=(I-\beta G)\Delta\Delta\Sigma_{xij}(I-\beta G)^T+\beta G\Delta\Delta\Sigma_n(\beta G)^T\alpha^2\Delta\Delta\Sigma_e \quad \text{[Equation 35]}$$

In the equations 34 and 35, $\Delta\Sigma_e$ and $\Delta\Delta\Sigma_e$ are variances of suppression errors derived from dynamic parameters.

Figure 17:
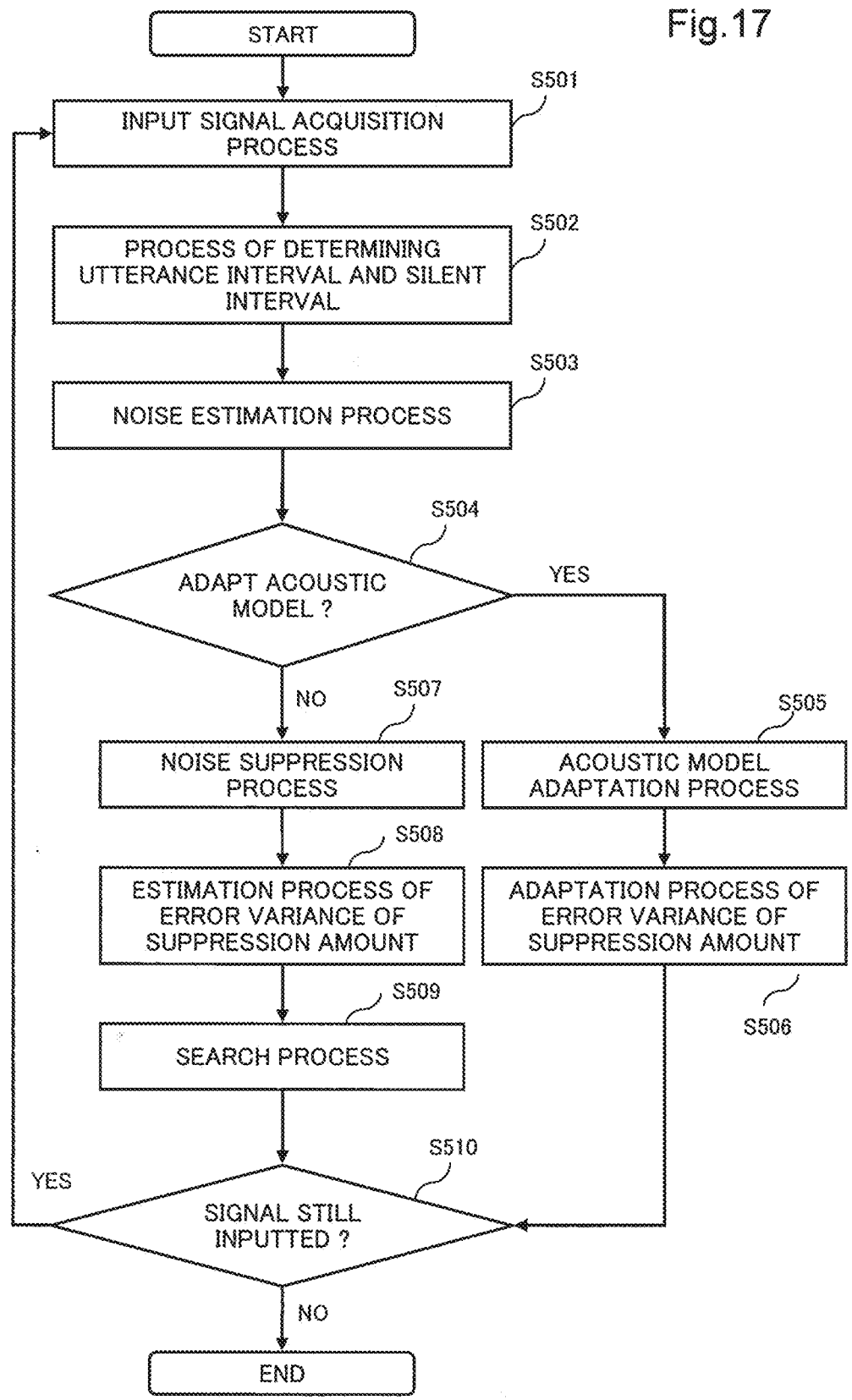
FIG. 17 is a flow chart illustrating an outline of operation of the speech recognition device according to the fifth exemplary embodiment.

FIG. 17 is a flow chart illustrating an outline of operation of the speech recognition device 500 according to the fifth exemplary embodiment of the present invention.

In FIG. 17, the processes in steps S501 to S505 are the same as that in the steps S101 to S105 according to the first exemplary embodiment. After the step S505, the speech recognition device 500 proceeds to a step S506.

In FIG. 17, the process in a step S507 is the same as that in the step S106 according to the first exemplary embodiment. After the step S507, the speech recognition device 500 proceeds to a step S508.

The error variance estimation unit 514 estimates the error variance of amounts of noise suppression in the noise-suppressed signals which are suppressed noise from the input signals on the basis of the suppression coefficient α by the noise suppression unit 102 (step S508). After the step S508, the speech recognition device 500 proceeds to a step S509.

In FIG. 17, the process in a step S509 is the same as that in the step S107 according to the first exemplary embodiment.

The error variance adaptation unit 515 adapts further model on the adapted acoustic model adapted by the acoustic model adaptation unit 103, on the basis of the error variance of amounts of noise suppression estimated by the error variance estimation unit 514 (step S506). After the step S506, the speech recognition device 500 proceeds to a step S510.

In FIG. 17, the process in the step S510 is the same as that in the step S108 according to the first exemplary embodiment.

The speech recognition device 500 according to the fifth exemplary embodiment estimates the error variance of amounts of noise suppression in noise-suppressed signals. Then, the speech recognition device 500 adapts further model on the adapted acoustic model adapted by the acoustic model adaptation unit 103 on the basis of the estimated error variance of amounts of noise suppression. Because the speech recognition device 500 adapts the model considering the error variance of amount of noise suppression, it can further approximate the variance of the model closer to the variance of features specified from the noise-suppressed signals. Accordingly, the speech recognition device 500 can realize higher voice recognition accuracy.

Sixth Exemplary Embodiment

Figure 18:
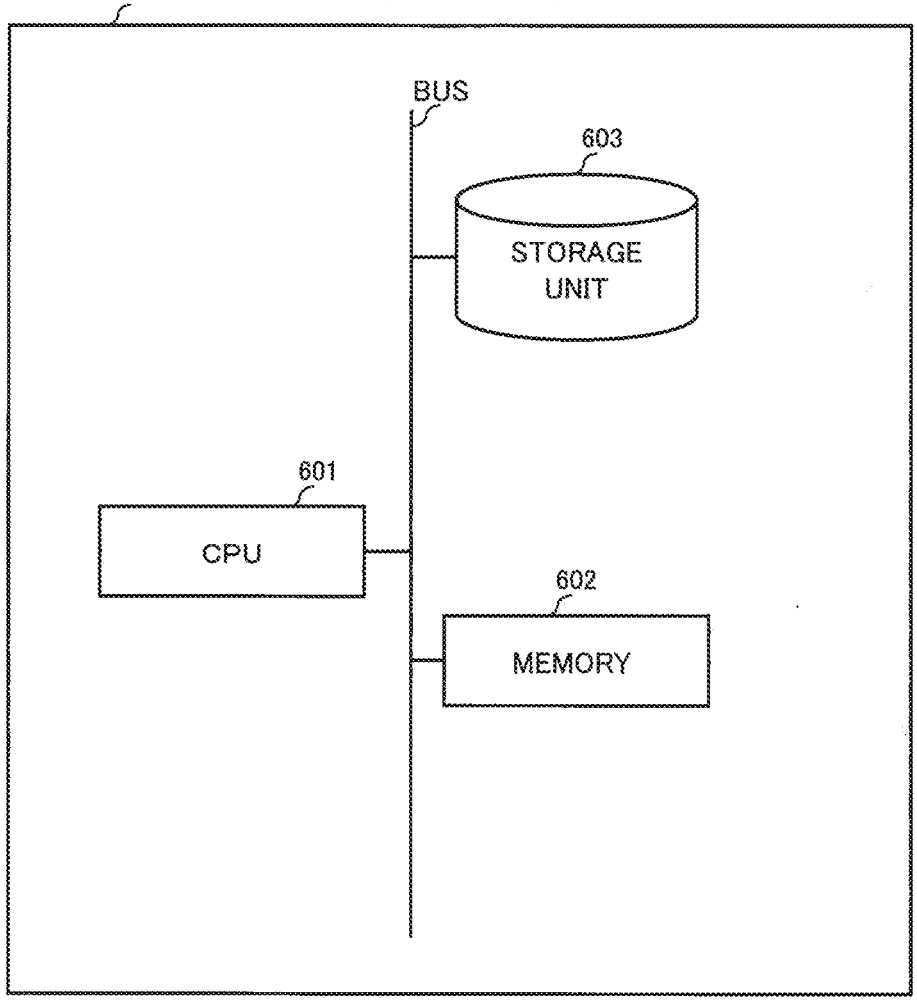
FIG. 18 is a block diagram showing a configuration of a speech recognition device according to a sixth exemplary embodiment.

FIG. 18 is a block diagram showing a configuration of a speech recognition device 600 according to a sixth exemplary embodiment of the present invention. Referring to FIG. 18, the speech recognition device 600 includes a CPU (Central Processing Unit) 601, a memory 602 and a storage unit 603.

The CPU 601 reads out software for the speech recognition device 600 executing the processes performed by the respective speech recognition devices according to the first to the fifth exemplary embodiments from the memory 602. Then, the CPU 601 functions as each of the units included in the respective speech recognition devices according to the first to the fifth exemplary embodiments on the basis of executing the read-out software.

The memory 602 stores the software for the speech recognition device 600 executing the processes performed by the respective speech recognition devices according to the first to the fifth exemplary embodiments.

The storage unit 603 stores information similarly to the respective storage units according to the first to the fifth exemplary embodiments.

The present invention includes also a storing medium 604 which stores primarily or stores the software for the speech recognition device 600 executing the processes of the respective speech recognition devices according to the first to the fifth exemplary embodiments. Accordingly, the memory 602 may read out the software recorded in the computer-readable storing medium 604, and the CPU 601 may then execute the read-out software.

The speech recognition device 600 according to the sixth exemplary embodiment has the same advantageous effects as that of the speech recognition devices according to the first to the fifth exemplary embodiments.

The related technologies described in Patent Documents 1 to 4 changes the speech recognition performance of a noise suppression method or a model adaptation, which are technologies for noise resistance, depending on the type of noise included in an input signal. Because of that, in each of the speech recognition devices based on simple installation of the respective related technologies, types of noises which can be dealt with are limited.

FIG. 19 is a table showing recognition rates of eight types of noises of AURORA2, which is a common evaluation platform of speech recognition tasks, by the noise suppression methods and the model adaptation methods in the related technologies. The eight types of noises are subway noise (subway), babble noise (babble), noise in a car (car), noise at an exhibition (exhibition), noise at a restaurant (restaurant), noise on the street (street), noise at the airport (airport) and noise at the station (train-station).

Referring to FIG. 19, the types of noises are shown in the title row, and types of SNRs are shown in the title column. Two numbers are given in each component of the matrix shown by the table of FIG. 19. The upper numbers are speech recognition rates by the model adaptation methods. The lower values are speech recognition rates by the noise suppression methods.

According to FIG. 19, the above-mentioned eight types of noises are classified into two noise groups; one is a group of noises whose recognition rates are higher by the model adaptation methods than by the noise suppression methods, and the other is that of noises whose recognition rates are higher by the noise suppression methods than by the model adaptation methods. In FIG. 19, the noises whose recognition rates are higher by the model adaptation methods than by the noise suppression methods are those corresponding to the squares with a filled circle attached in their upper right area. Alternatively, in FIG. 19, the noises whose recognition rates are higher by the noise suppression methods than by the model adaptation methods are those corresponding to the squares enclosed by a bold line. Here, with respect to "babble", "restaurant", "airport" and "train-station", there is a tendency that their recognition rates are higher when using the model adaptation methods. On the other hand, with respect to "subway", "car", "exhibition" and "street", there is a tendency that their recognition rates are higher when using the noise suppression methods. A characteristic of the noises whose recognition rates are higher by the model adaptation methods than by the noise suppression methods is that they include a large amount of babble noise. On the other hand, a characteristic of the noises whose recognition rates are higher by the noise suppression methods than by the model adaptation methods is that they include little amount of babble noise. The reason why the above-described phenomenon occurs will be described in detail below on the basis of weaknesses of the noise suppression methods and the model adaptation methods.

In the noise suppression methods, successively estimated noises are used for noise suppression of an input signal. However, recognition accuracy remarkably deteriorates with deteriorating accuracy of the estimated noises. This will be explained taking an SS method as an example. When a true noise is $N^2$, an estimation error is $\epsilon$ and an estimated noise $N'^2$ is thus expressed as $(N^2+\epsilon)$, a noise-suppressed signal based on an SS method is expressed by a following equation 36.

$$X_{SS}^2 = \max[Y^2 - (N^2 + \epsilon), \gamma] \quad \text{[Equation 36]}$$

Here, an ideal noise-suppressed signal is calculated by a following equation 37.

$$X_{SS}^2 = Y^2 - N^2 \quad \text{[Equation 37]}$$

As expressed in the equation 36, when the estimation error $\epsilon$ is large, a value of the noise-suppressed signal deviates from the ideal value. And, a value obtained by taking a logarithmic of the value of a noise-suppressed signal is generally used in the process of deriving a feature used in speech recognition. Accordingly, the larger the true noise $N^2$, $Y^2-N^2$ takes a value closer to zero. That is, the estimation error $\epsilon$ gives larger influence on the feature calculated from the noise-suppressed signal. Here, with respect to a noise including a large amount of babble noise, noise estimation is difficult, and it is highly possible for estimation failure to occur. Therefore, the recognition rates based on the noise suppression methods deteriorate with respect to a noise including a large amount of babble noise.

On the other hand, in the model adaptation methods, when adapting model, an average and a variance which are estimated spending a relatively long time period are used. Accordingly, speech recognition using the model adaptation methods can realize high recognition accuracy with respect to babble noise whose successive estimation is difficult. However, with respect to a noise including no babble noise, because accuracy of successive noise estimation is high, the recognition rates of the noise suppression methods are higher than that of the model adaptation methods.

As described above, each of the speech recognition technologies with the respective related technologies installed on their own has restriction on the types of noises which can be dealt with. It is necessary to install a method which appropriately combines a noise suppression method and an acoustic model adaptation model method for corresponding to make the one method possible to deal with a noise which is not good at other of the related technologies respectively.

Because the speech recognition devices according to the respective exemplary embodiments of the present invention suppresses noise by using the noise suppression method and the acoustic model adaptation method in an appropriate combination, they can increase the types of noises which can be dealt with enough to enable speech recognition with a speech recognition rate of high accuracy.

Figure 20:
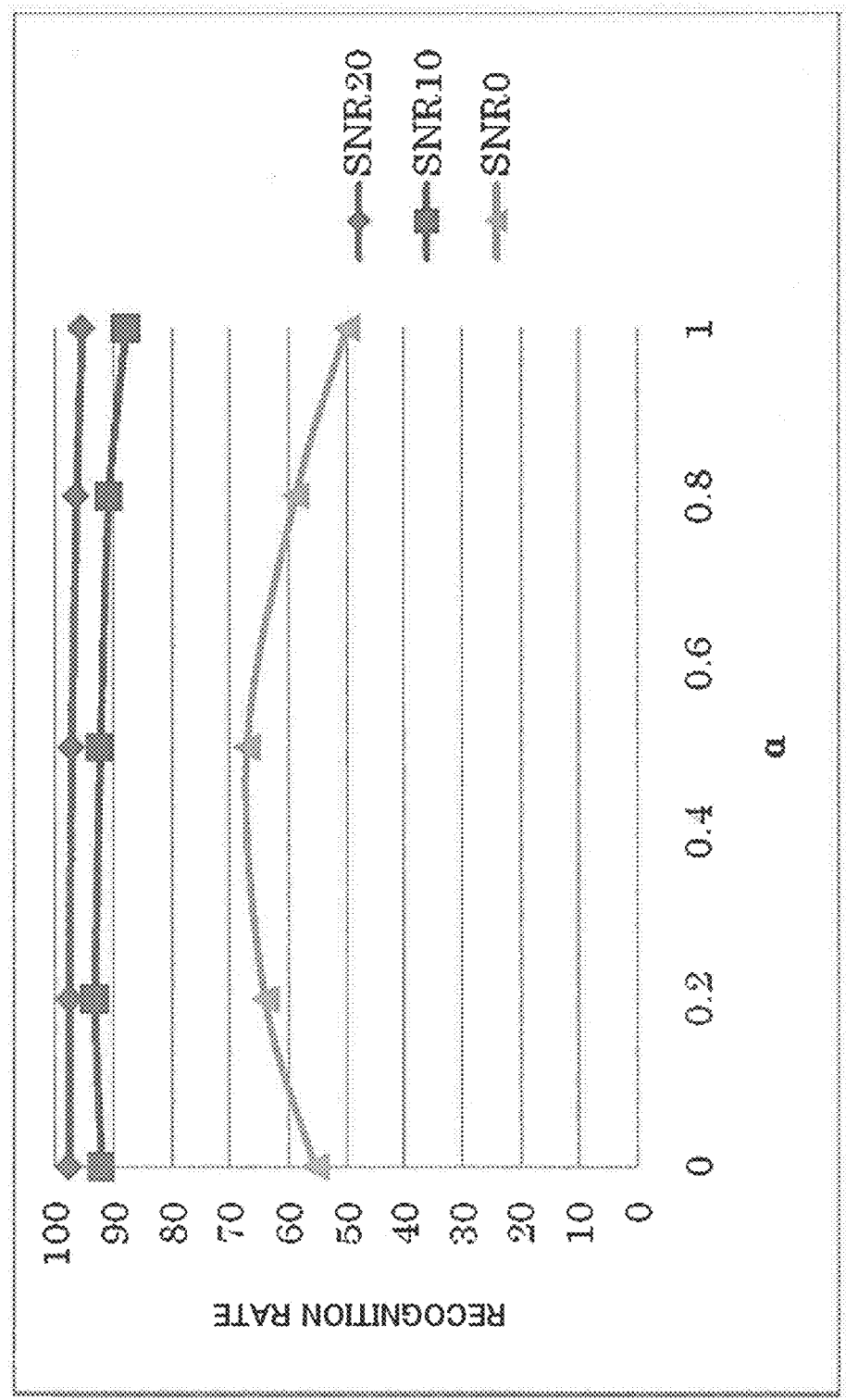
FIG. 20 is a diagram showing relationships between the suppression coefficient α and the recognition rate.

FIG. 20 is a diagram showing relationships between the suppression coefficient $\alpha$ and the recognition rate. In FIG. 20, when $\alpha=0$, the recognition rate is equivalent to that of when only the model adaptation method is installed. On the other hand, when $\alpha=1$, the recognition rate is equivalent to that of when only the noise suppression method is installed.

As a noise added to an input signal, subway noises (SNR20, SNR10 and SNR0) of AURORA2 are used. And, as the noise suppression method, the NS-WiNE method (the WiNE (Weighted Noise Estimation) method for noise estimation and the MMSESTSA (minimum mean-square-error short-time spectral amplitude estimator) method for noise suppression) is used. And, as the model adaptation method, the VTS method is used with respect to the average parameters. With respect to the estimation of the variance parameters, values of a clean model are used.

Referring to FIG. 20, in any case of the SNR20, SNR10 and SNR0, it is revealed that the speech recognition rate is a maximum when $\alpha$ is 0.5. Particularly, in the case of the SNR0 noise, it is remarkably revealed that the speech recognition rate is a maximum when $\alpha$ is 0.5. FIG. 20 indicates that a remarkable effect of the speech recognition devices according to the respective exemplary embodiments of the present invention is achieved.

An example of an advantageous effect of the present invention is that it is possible to increase the types of noises which can be dealt with enough to enable speech recognition with a speech recognition rate of high accuracy.

While the invention has been particularly shown and described with reference to exemplary embodiments and examples thereof, the invention is not limited to these embodiments. It will be understood by those of ordinary skill in the art that various changes in form and details may be made therein without departing from the spirit and scope of the present invention as defined by the claims.

With respect to the constituent elements in each of the exemplary embodiments and examples thereof, it is obvious that their functions can be realized by hardware, and they can be realized also by the use of a computer and a program. The program is provided in the form of being recorded on a computer-readable storing medium such as a magnetic disk and a semiconductor memory, and is read out at the time such as of starting up the computer. The read-out program causes the computer to function as the above-mentioned constituent elements in each of the exemplary embodiments and examples thereof, on the basis of its controlling the operation of the computer.

The whole or part of the exemplary embodiments disclosed above can be described as, but not limited to, the following supplementary notes.

(Supplementary Note 1)

Speech recognition device comprising:

a coefficient storage means for storing a suppression coefficient representing an amount of noise suppression and an adaptation coefficient representing an amount of adaptation of a noise model which is generated on the basis of a predetermined noise and is synthesized to a clean acoustic model generated on the basis of a voice which does not include noise, in a manner to relate them to each other;

a noise estimation means for estimating noise from an input signal;

a noise suppression means for suppressing a portion of the noise specified by a suppression amount specified on the basis of the suppression coefficient, among from the noise estimated by the noise estimation means, from the input signal;

an acoustic model adaptation means for generating an adapted acoustic model which is noise-adapted, by synthesizing the noise model, which is generated on the basis of the noise estimated by the noise estimation means in accordance with an amount of adaptation specified on the basis of the adaptation coefficient, to the clean acoustic model; and a search means for recognizing voice on the basis of the input suppressed noise by the noise suppression means and the adapted acoustic model generated by the acoustic model adaptation means.

(Supplementary Note 2)

The speech recognition device according to supplementary note 1, wherein the sum of the suppression coefficient and the adaptation coefficient is a predetermined value or matrix.

(Supplementary Note 3)

The speech recognition device according to supplementary notes 1 or 2, comprising:

a training data storage means for storing training data including at least one noise; and a coefficient determination means for updating the suppression coefficient and the adaptation coefficient stored in the coefficient storage means; wherein the coefficient determination means takes a noise included in the training data as observed data, and updates a suppression coefficient and an adaptation coefficient stored in the coefficient storage means, on the basis of a suppression coefficient and an adaptation coefficient which maximize an expected value of a likelihood function which takes a suppression coefficient and an adaptation coefficient as parameters.

(Supplementary Note 4)

The speech recognition device according to supplementary notes 1 or 2, comprising:

a coefficient determination means for updating the suppression coefficient and the adaptation coefficient stored in the coefficient storage means, wherein the coefficient determination means takes a noise estimated by the noise estimation means as observed data, and updates a suppression coefficient and an adaptation coefficient stored in the coefficient storage means on the basis of a suppression coefficient and an adaptation coefficient which maximize an expected value of a likelihood function which takes the suppression coefficient and adaptation coefficient of the last update as parameters, when the differences between the suppression coefficient and the adaptation coefficient which are updated last, and the suppression coefficient and the adaptation coefficient which are updated before last are not both equal to or smaller than a predetermined threshold value.

(Supplementary Note 5)

The speech recognition device according to any one of supplementary notes 1 to 4, comprising:

an estimated noise classification means for determining a class to which the noise estimated by the noise estimation means belongs to, wherein the coefficient storage means stores a noise identifier enabling identification of a class to which the noise belongs, a suppression coefficient and an adaptation coefficient, in a manner to relate them to each other;

the noise suppression means suppresses a portion of noise specified by a suppression amount specified on the basis of a suppression coefficient which is related to a noise identifier corresponding to the noise class determined by the estimated noise classification means, among from the noise estimated by the noise estimation means, from the input signal; and the acoustic model adaptation means generates an adapted acoustic model which is noise-adapted, on the basis of synthesizing with a noise model generated on the basis of the noise estimated by the noise estimation means, in accordance with an amount of adaptation specified on the basis of an adaptation coefficient which is related to a noise identifier corresponding to the noise class determined by the estimated noise classification means, with respect to the clean acoustic model.

(Supplementary Note 6)

The speech recognition device according to supplementary note 5, comprising:

a coefficient determination means for determining the suppression coefficient and the adaptation coefficient when receiving a noise, wherein the coefficient determination means takes a noise of a class determined by the estimated noise classification means as observed data, calculates a suppression coefficient and an adaptation coefficient which maximize an expected value of a likelihood function which takes a suppression coefficient and an adaptation coefficient as parameters, and stores the calculated suppression coefficient and adaptation coefficient, and a noise identifier enabling identification of the class to which the noise belongs, in a manner to relate them to each other, into the coefficient storage means.

(Supplementary Note 7)

The speech recognition device according to any one of supplementary notes 1 to 6, wherein the noise suppression means comprises:

an error variance estimation means for estimating an error variance of amounts of noise suppression in noise-suppressed signals suppressed noise from the input signals on the basis of a suppression coefficient stored in the coefficient storage means; and an error variance adaptation means for updating the adapted acoustic model adapted by the acoustic model adaptation means, on the basis of the error variance estimated by the error variance estimation means.

(Supplementary Note 8)

The speech recognition device according to supplementary notes 3 or 4, wherein:

the coefficient determination means stores the value of the suppression coefficient or adaptation coefficient before the update when updating a value of the suppression coefficient or adaptation coefficient stored in the coefficient storage means; and the coefficient determination means updates a suppression coefficient and an adaptation coefficient stored in the coefficient storage means, when the differences between the suppression coefficient and the adaptation coefficient which are updated last, and the suppression coefficient and the adaptation coefficient which are updated before last are not both equal to or smaller than a predetermined threshold value.

(Supplementary Note 9)

The speech recognition device according to any one of supplementary notes 1 to 8, wherein the sum of the suppression coefficient and the adaptation coefficient is 1 or a unit matrix.

(Supplementary Note 10)

A voice recognition method comprising:

storing a suppression coefficient representing an amount of noise suppression and an adaptation coefficient representing an amount of adaptation of a noise model which is generated on the basis of a predetermined noise and is synthesized to a clean acoustic model generated on the basis of a voice which does not include noise, in a manner to relate them to each other;

estimating noise from an input signal;

suppressing a portion of the noise specified by a suppression amount specified on the basis of the suppression coefficient, among from the noise estimated, from the input signal;

generating an adapted acoustic model which is noise-adapted, by synthesizing the noise model, which is generated on the basis of the estimated noise in accordance with an amount of adaptation specified on the basis of the adaptation coefficient, to the clean acoustic model; and recognizing voice on the basis of the noise-suppressed input signal and the generated adapted acoustic model.

(Supplementary Note 11)

The voice recognition method according to supplementary note 10, wherein the sum of the suppression coefficient and the adaptation coefficient is a predetermined value or matrix.

(Supplementary Note 12)

The voice recognition method according to supplementary notes 10 or 11, comprising:

storing training data including at least one noise;

taking a noise included in the training data as observed data; and updating the stored suppression coefficient and the adaptation coefficient, on the basis of a suppression coefficient and an adaptation coefficient which maximize an expected value of a likelihood function which takes a suppression coefficient and an adaptation coefficient as parameters.

(Supplementary Note 13)

The voice recognition method according to supplementary notes 10 or 11, further comprising:

taking the estimated noise as observed data updating the stored suppression coefficient and the stored adaptation coefficient on the basis of a suppression coefficient and an adaptation coefficient which maximize an expected value of a likelihood function which takes the suppression coefficient and adaptation coefficient of the last update as parameters, when the differences between the suppression coefficient and the adaptation coefficient which are updated last, and the suppression coefficient and the adaptation coefficient which are updated before last are not both equal to or smaller than a predetermined threshold value.

(Supplementary Note 14)

The voice recognition method according to any one of supplementary notes 10 to 13, comprising:

determining a class to which the estimated noise belongs;

storing a noise identifier representing a noise type, a suppression coefficient and an adaptation coefficient, in a manner to relate them to each other;

suppressing a portion of noise specified by a suppression amount specified on the basis of a suppression coefficient which is related to a noise identifier corresponding to the determined type of the noise among from the estimated noise, from the input signal; and generating an adapted acoustic model which is noise-adapted, on the basis of synthesizing with a noise model generated on the basis of the estimated noise, in accordance with an amount of adaptation specified on the basis of an adaptation coefficient which is related to a noise identifier corresponding to the determined type of the noise, with respect to the clean acoustic model.

(Supplementary Note 15)

The voice recognition method according to supplementary note 14, comprising taking the classified noise as observed data calculating a suppression coefficient and an adaptation coefficient which maximize an expected value of a likelihood function which takes a suppression coefficient and an adaptation coefficient as parameters, and storing the calculated suppression coefficient and adaptation coefficient, and a noise identifier enabling identification of the class to which the noise belongs, in a manner to relate them to each other.

(Supplementary Note 16)

The voice recognition method according to any one of supplementary notes 10 to 15, comprising:

estimating an error variance of amounts of noise suppression in noise-suppressed signals suppressed noise from the input signals on the basis of the stored suppression coefficient; and adapting model to the adapted acoustic model which has adapted, on the basis of the error variance obtained by the estimation.

(Supplementary Note 17)

The voice recognition method according to supplementary notes 12 or 13, comprising:

storing the value of the suppression coefficient or adaptation coefficient before the update when updating a value of the stored suppression coefficient or adaptation coefficient; and updating the stored suppression coefficient and adaptation coefficient, when the differences between the suppression coefficient and the adaptation coefficient which are updated last, and the suppression coefficient and the adaptation coefficient which are updated before last are not both equal to or smaller than a predetermined threshold value.

(Supplementary Note 18)

The voice recognition method according to any one of supplementary notes 10 to 17, wherein the sum of the suppression coefficient and the adaptation coefficient is 1 or a unit matrix.

(Supplementary Note 19)

A computer readable medium embodying a program, the program causing a speech recognition device to perform a method, the method comprising:

storing a suppression coefficient representing an amount of noise suppression and an adaptation coefficient representing an amount of adaptation of a noise model which is generated on the basis of a predetermined noise and is synthesized to a clean acoustic model generated on the basis of a voice which does not include noise, in a manner to relate them to each other;

estimating noise from an input signal;

suppressing a portion of the noise specified by a suppression amount specified on the basis of the suppression coefficient, among from the noise estimated, from the input signal;

generating an adapted acoustic model which is noise-adapted, by synthesizing the noise model, which is generated on the basis of the estimated noise in accordance with an amount of adaptation specified on the basis of the adaptation coefficient, to the clean acoustic model; and recognizing voice on the basis of the noise-suppressed input signal and the generated adapted acoustic model.

(Supplementary Note 20)

The computer readable medium according to supplementary note 19, wherein the sum of the suppression coefficient and the adaptation coefficient is a predetermined value or matrix.

(Supplementary Note 21)

The computer readable medium according to supplementary notes 19 or 20, the method comprising:

storing training data including at least one noise; and taking a noise included in the training data as observed data, and updating the stored suppression coefficient and the adaptation coefficient, on the basis of a suppression coefficient and an adaptation coefficient which maximize an expected value of a likelihood function which takes a suppression coefficient and an adaptation coefficient as parameters.

(Supplementary Note 22)

The computer readable medium according to supplementary notes 19 or 20, the method comprising:

taking the estimated noise as observed data, and updating the stored suppression coefficient and the stored adaptation coefficient on the basis of a suppression coefficient and an adaptation coefficient which maximize an expected value of a likelihood function which takes the suppression coefficient and adaptation coefficient of the last update as parameters, when the differences between the suppression coefficient and the adaptation coefficient which are updated last, and the suppression coefficient and the adaptation coefficient which are updated before last are not both equal to or smaller than a predetermined threshold value.

(Supplementary Note 23)

The computer readable medium according to any one of supplementary notes 19 to 22, the method comprising:

determining a class to which the estimated noise belongs;

storing a noise identifier representing a noise type, a suppression coefficient and an adaptation coefficient, in a manner to relate them to each other;

suppressing a portion of noise specified by a suppression amount specified on the basis of a suppression coefficient which is related to a noise identifier corresponding to the determined type of the noise among from the estimated noise, from the input signal a part; and generating an adapted acoustic model which is noise-adapted, on the basis of synthesizing with a noise model generated on the basis of the estimated noise, in accordance with an amount of adaptation specified on the basis of an adaptation coefficient which is related to a noise identifier corresponding to the determined type of the noise with respect to the clean acoustic model.

(Supplementary Note 24)

The computer readable medium according to supplementary note 23, the method comprising:

taking the classified noise as observed data, and calculating a suppression coefficient and an adaptation coefficient which maximize an expected value of a likelihood function which takes a suppression coefficient and an adaptation coefficient as parameters, and storing the calculated suppression coefficient and adaptation coefficient, and a noise identifier enabling identification of the class to which the noise belongs, in a manner to relate them to each other.

(Supplementary Note 25)

The computer readable medium according to any one of supplementary notes 19 to 24, the method comprising:

estimating an error variance of amounts of noise suppression in noise-suppressed signals suppressed noise from the input signals on the basis of the stored suppression coefficient; and adapting model to the adapted acoustic model which has adapted, on the basis of the error variance obtained by the estimation.

(Supplementary Note 26)

The computer readable medium according to supplementary notes 21 or 22, the method comprising:

storing the value of the suppression coefficient or adaptation coefficient before the update when updating a value of the stored suppression coefficient or adaptation coefficient; and updating the stored suppression coefficient and adaptation coefficient, when the differences between the suppression coefficient and the adaptation coefficient which are updated last, and the suppression coefficient and the adaptation coefficient which are updated before last are not both equal to or smaller than a predetermined threshold value.

(Supplementary Note 27)

The computer readable medium according to any one of supplementary notes 19 to 26, wherein the sum of the suppression coefficient and the adaptation coefficient is 1 or a unit matrix.

INDUSTRIAL APPLICATION

The present invention can be used as a speech recognition device dealing with an input signal including various types of noises.

DESCRIPTION OF SYMBOL 100, 200, 300, 400, 500, 600 speech recognition device
101, 201 noise estimation unit
102, 202, 302, 402 noise suppression unit
103, 403 acoustic model adaptation unit
104, 304 search unit
105, 205, 405 coefficient storage unit
106 input unit
107 clean acoustic model storage unit
108 estimated noise storage unit
109 adapted acoustic model storage unit
210 coefficient determination unit
211 training signal storage unit
212 noise-suppressed signal storage unit
413 estimated noise classification unit
514 error variance estimation unit
515 error variance adaptation unit
601 CPU
602 memory
603 storage unit
604 storing medium

What is claimed is:

1. A speech recognition device comprising:
a coefficient storage unit which stores a suppression coefficient representing an amount of noise suppression and an adaptation coefficient representing an amount of adaptation which is generated on the basis of a predetermined noise and is synthesized to a clean acoustic model generated on the basis of a voice which does not include noise, in a manner to relate the suppression coefficient with the adaptation coefficient to each other;
a noise estimation unit which estimates noise from an input signal;
a noise suppression unit which suppresses a portion of the noise specified by a suppression amount specified on the basis of the suppression coefficient, among from the noise estimated by said noise estimation unit, from the input signal;
an acoustic model adaptation unit which generates an adapted acoustic model which is noise-adapted, by synthesizing the noise model, which is generated on the basis of the noise estimated by said noise estimation unit in accordance with an amount of adaptation specified on the basis of the adaptation coefficient, to the clean acoustic model; and
a search unit which recognizes voice on the basis of the input suppressed noise by said noise suppression unit and the adapted acoustic model generated by said acoustic model adaptation unit.

2. The speech recognition device according to claim 1, wherein
the sum of the suppression coefficient and the adaptation coefficient is a predetermined value or matrix.

3. The speech recognition device according to claim 1 comprising:
- a training data storage unit which stores training data including at least one noise; and
- a coefficient determination unit which updates the suppression coefficient and the adaptation coefficient stored in said coefficient storage unit; wherein
- said coefficient determination unit takes a noise included in the training data as observed data, and updates a suppression coefficient and an adaptation coefficient stored in said coefficient storage unit, on the basis of a suppression coefficient and an adaptation coefficient which maximize an expected value of a likelihood function which takes a suppression coefficient and an adaptation coefficient as parameters.

4. The speech recognition device according to claim 1, comprising:
- a coefficient determination unit which stores the suppression coefficient and the adaptation coefficient stored in said coefficient storage unit, wherein
- said coefficient determination unit takes a noise estimated by said noise estimation unit as observed data, and updates a suppression coefficient and an adaptation coefficient stored in said coefficient storage unit on the basis of a suppression coefficient and an adaptation coefficient which maximize an expected value of a likelihood function which takes the suppression coefficient and adaptation coefficient of the last update as parameters, when the differences between the suppression coefficient and the adaptation coefficient which are updated last, and the suppression coefficient and the adaptation coefficient which are updated before last are not both equal to or smaller than a predetermined threshold value.

5. The speech recognition device according to claim 1, comprising:
- an estimated noise classification unit which determines a class to which the noise estimated by said noise estimation unit belongs to, wherein
- said coefficient storage unit stores a noise identifier enabling identification of a class to which the noise belongs, a suppression coefficient and an adaptation coefficient, in a manner to relate them to each other;
- said noise suppression unit suppresses a portion of noise specified by a suppression amount specified on the basis of a suppression coefficient which is related to a noise identifier corresponding to the noise class determined by said estimated noise classification unit, among from the noise estimated by said noise estimation unit, from the input signal; and
- said acoustic model adaptation unit generates an adapted acoustic model which is noise-adapted, on the basis of synthesizing with a noise model generated on the basis of the noise estimated by said noise estimation unit, in accordance with an amount of adaptation specified on the basis of an adaptation coefficient which is related to a noise identifier corresponding to the noise class determined by said estimated noise classification unit, with respect to the clean acoustic model.

6. The speech recognition device according to claim 5, comprising:
- a coefficient determination unit which determines the suppression coefficient and the adaptation coefficient when receiving a noise, wherein
- said coefficient determination unit takes a noise of a class determined by said estimated noise classification unit as observed data, calculates a suppression coefficient and an adaptation coefficient which maximize an expected value of a likelihood function which takes a suppression coefficient and an adaptation coefficient as parameters, and stores the calculated suppression coefficient and adaptation coefficient, and a noise identifier enabling identification of the class to which the noise belongs, in a manner to relate them to each other, into said coefficient storage unit.

7. The speech recognition device according to claim 1, wherein
said noise suppression unit comprises:
- an error variance estimation unit which estimates an error variance of amounts of noise suppression in noise-suppressed signals suppressed noise from the input signals on the basis of a suppression coefficient stored in said coefficient storage unit; and
- an error variance adaptation unit which updates the adapted acoustic model adapted by said acoustic model adaptation, on the basis of the error variance estimated by said error variance estimation unit.

8. The speech recognition device according to claim 3, wherein:
- said coefficient determination unit stores the value of the suppression coefficient or adaptation coefficient before the update when updating a value of the suppression coefficient or adaptation coefficient stored in said coefficient storage unit; and
- said coefficient determination unit updates a suppression coefficient and an adaptation coefficient stored in said coefficient storage unit, when the differences between the suppression coefficient and the adaptation coefficient which are updated last, and the suppression coefficient and the adaptation coefficient which are updated before last are not both equal to or smaller than a predetermined threshold value.

9. The speech recognition device according to claim 1, wherein
the sum of the suppression coefficient and the adaptation coefficient is 1 or a unit matrix.

10. A voice recognition method comprising:
storing a suppression coefficient representing an amount of noise suppression and an adaptation coefficient representing an amount of adaptation which is generated on the basis of a predetermined noise and is synthesized to a clean acoustic model generated on the basis of a voice which does not include noise, in a manner to relate the suppression coefficient with the adaptation coefficient to each other;
estimating noise from an input signal;
suppressing a portion of the noise specified by a suppression amount specified on the basis of the suppression coefficient, among from the noise estimated, from the input signal;
generating an adapted acoustic model which is noise-adapted, by synthesizing the noise model, which is generated on the basis of the estimated noise in accordance with an amount of adaptation specified on the basis of the adaptation coefficient, to the clean acoustic model; and
recognizing voice on the basis of the noise-suppressed input signal and the generated adapted acoustic model.

11. The voice recognition method according to claim 10, wherein
the sum of the suppression coefficient and the adaptation coefficient is a predetermined value or matrix.

12. The voice recognition method according to claim 10, comprising:
storing training data including at least one noise;
taking a noise included in the training data as observed data; and
updating the stored suppression coefficient and the adaptation coefficient, on the basis of a suppression coefficient and an adaptation coefficient which maximize an expected value of a likelihood function which takes a suppression coefficient and an adaptation coefficient as parameters.

13. The voice recognition method according to claim 10, further comprising:
taking the estimated noise as observed data
updating the stored suppression coefficient and the stored adaptation coefficient on the basis of a suppression coefficient and an adaptation coefficient which maximize an expected value of a likelihood function which takes the suppression coefficient and adaptation coefficient of the last update as parameters, when the differences between the suppression coefficient and the adaptation coefficient which are updated last, and the suppression coefficient and the adaptation coefficient which are updated before last are not both equal to or smaller than a predetermined threshold value.

14. The voice recognition method according to claim 10, comprising:
determining a class to which the estimated noise belongs;
storing a noise identifier representing a noise type, a suppression coefficient and an adaptation coefficient, in a manner to relate them to each other;
suppressing a portion of noise specified by a suppression amount specified on the basis of a suppression coefficient which is related to a noise identifier corresponding to the determined type of the noise among from the estimated noise, from the input signal; and
generating an adapted acoustic model which is noise-adapted, on the basis of synthesizing with a noise model generated on the basis of the estimated noise, in accordance with an amount of adaptation specified on the basis of an adaptation coefficient which is related to a noise identifier corresponding to the determined type of the noise, with respect to the clean acoustic model.

15. The voice recognition method according to claim 14, comprising
taking the classified noise as observed data
calculating a suppression coefficient and an adaptation coefficient which maximize an expected value of a likelihood function which takes a suppression coefficient and an adaptation coefficient as parameters, and storing the calculated suppression coefficient and adaptation coefficient, and a noise identifier enabling identification of the class to which the noise belongs, in a manner to relate them to each other.

16. The voice recognition method according to claim 10, comprising:
estimating an error variance of amounts of noise suppression in noise-suppressed signals suppressed noise from the input signals on the basis of the stored suppression coefficient; and
adapting model to the adapted acoustic model which has adapted, on the basis of the error variance obtained by the estimation.

17. The voice recognition method according to claim 12, comprising:
storing the value of the suppression coefficient or adaptation coefficient before the update when updating a value of the stored suppression coefficient or adaptation coefficient; and
updating the stored suppression coefficient and adaptation coefficient, when the differences between the suppression coefficient and the adaptation coefficient which are updated last, and the suppression coefficient and the adaptation coefficient which are updated before last are not both equal to or smaller than a predetermined threshold value.

18. The voice recognition method according to claim 10, wherein
the sum of the suppression coefficient and the adaptation coefficient is 1 or a unit matrix.

19. A computer readable non-transitory medium embodying a program, said program causing a speech recognition device to perform a method, said method comprising:
storing a suppression coefficient representing an amount of noise suppression and an adaptation coefficient representing an amount of adaptation which is generated on the basis of a predetermined noise and is synthesized to a clean acoustic model generated on the basis of a voice which does not include noise, in a manner to relate the suppression coefficient with the adaptation coefficient to each other;
estimating noise from an input signal;
suppressing a portion of the noise specified by a suppression amount specified on the basis of the suppression coefficient, among from the noise estimated, from the input signal;
generating an adapted acoustic model which is noise-adapted, by synthesizing the noise model, which is generated on the basis of the estimated noise in accordance with an amount of adaptation specified on the basis of the adaptation coefficient, to the clean acoustic model; and
recognizing voice on the basis of the noise-suppressed input signal and the generated adapted acoustic model.

20. The computer readable medium according to claim 19, wherein
the sum of the suppression coefficient and the adaptation coefficient is a predetermined value or matrix.

* * * * *